United States Patent [19]

Weaver, Jr. et al.

[11] Patent Number: 5,278,255
[45] Date of Patent: Jan. 11, 1994

[54] UNSATURATED POLYAMINOPOLYMER, DERIVATIVES THEREOF AND PROCESSES FOR MAKING

[75] Inventors: Otha G. Weaver, Jr., Lake Jackson; Terry W. Glass, Richwood; Wanda G. Buckner, Lake Jackson, all of Tex.

[73] Assignee: The Dow Chemical Company, Midland, Mich.

[21] Appl. No.: 927,988

[22] Filed: Aug. 11, 1992

Related U.S. Application Data

[63] Continuation-in-part of Ser. No. 751,035, Aug. 28, 1991, abandoned, which is a continuation-in-part of Ser. No. 568,917, Aug. 17, 1990, abandoned.

[51] Int. Cl.$^5$ .............................................. C08G 69/48
[52] U.S. Cl. .................... 525/421; 525/426; 525/430; 525/435; 528/335; 528/342; 528/345
[58] Field of Search ............... 525/421, 426, 430, 435; 528/335, 342, 345

[56] References Cited

U.S. PATENT DOCUMENTS

3,051,751  8/1962  Lewis, Jr. et al. .
3,058,873  10/1962 Keim et al. .
3,197,427  11/1965 Schmalz et al. .
3,240,761  3/1966  Keim et al. .

(List continued on next page.)

FOREIGN PATENT DOCUMENTS

2092150  8/1982  United Kingdom .

OTHER PUBLICATIONS

Geo. Clifford White, The Handbook of Chlorination, 2nd Edition, p. 152, (1986).
N. H. Agnew et al., J. Chem. Soc. (London), Sect. C, pp. 203-208 (1966).
Chemical Abstract 97:56043M (1982).
S. Hedge, et al., J. Org. Chem. pp. 3148-3150, (1982).

*Primary Examiner*—Harold D. Anderson

[57] ABSTRACT

The present invention is a process for preparing a polyaminopolymer which contains functionality comprising the steps of (a) contacting a polyfunctional amine with an unsaturated alkylating agent under reaction conditions to form an amine/unsaturated alkylating agent adduct; (b) contacting the adduct with a polyfunctional compound such that a polyaminopolymer is formed; (c) contacting the polyaminopolymer with a halogen, hypohalous acid or precursor thereof such that a polyaminopolymer having halohydrin or dihalo functionality is formed; and (d) raising the pH of the polyaminopolymer having halohydrin or vicinal dihalo functionality sufficiently to cause an increase in molecular weight. Alternatively, the invention is a process having steps (a), (b), (c) and optionally (d), but with a step (h) between steps (b) and (c) of contacting the polyaminopolymer with a crosslinking agent therefor having at least two functional groups reactive with amine groups such that a crosslinked polyaminopolymer is formed. The invention includes polyaminopolymers so prepared, papers prepared using such polymers, and processes for preparing such papers. The papers so prepared preferably have improved wet strength. The polyaminopolymers are useful when dried and redissolved. Certain of the polyamino-polymers have structures of Formula IV:

$$[-R'N-(C_nH_{2n}NR)_m-CO-Q-CO-]$$

wherein R and R' are independently H or an unsaturated organic group; n is the number of carbon atoms between nitrogen atoms in a repeating unit of an amine which unit is repeated m times; and Q is divalent organic group of a dicarboxylic polyfunctional compound. Compounds of Formula IV are also made by forming a polyamide then alkylating the polyamide with excess alkylating agent at high pH.

48 Claims, No Drawings

OTHER PUBLICATIONS 3,532,751 10/1970 Langher et al. .
3,558,501 1/1971 McGuire .
3,565,941 2/1971 Dick et al. .
3,578,400 5/1971 Wojtowicz et al. .
3,634,523 1/1972 Lund et al. .
3,845,145 10/1974 Wojtowicz et al. .
3,947,383 3/1976 Baggett .
4,096,133 6/1978 Zweigle .
4,172,840 10/1979 Hildon et al. .
4,287,110 9/1981 Takagishi et al. ............ 260/29.2 EP
4,336,835 6/1982 Takagishi et al. ................ 162/164.3
4,354,006 10/1982 Bankert .
4,410,714 10/1983 Apanel .
4,419,498 12/1983 Bankert .
4,419,500 12/1983 Bankert .
4,481,092 11/1984 Mansfield .
4,520,159 5/1985 Maslanka .
5,110,878 5/1992 Amey .

UNSATURATED POLYAMINOPOLYMER, DERIVATIVES THEREOF AND PROCESSES FOR MAKING

CROSS REFERENCE TO A RELATED APPLICATION

This application is a continuation-in-part of application Ser. No. 07/751,035 filed Aug. 28, 1991 which is a continuation-in-part of application Ser. No. 07/568,917 filed Aug. 17, 1990, both abandoned, both of which are incorporated herein in their entirities.

BACKGROUND OF THE INVENTION

This invention relates to polyamine reactions and their use in preparing polyaminopolymers, particularly to preparation of certain polyaminopolymers having halohydrin or dihalo (at least one halogen on each of two adjacent carbon atoms) functionality.

Certain resins are used to improve wet strength of paper. Such resins include reaction products of certain polyamides with a halohydrin, or a precursor thereof, e.g. an epihalohydrin such as is disclosed in U.S. Pat. Nos. 2,926,116; 2,926,154; and 3,332,901. Certain of these resins are sold by Hercules Incorporated under the tradename Kymene ™.

When epihalohydrins are used in preparing the resins, there is sometimes residual epihalohydrin, which may cause inconvenient handling procedures to avoid human contact. Use of epihalohydrin is avoided in such processes as those disclosed in U.S. Pat. Nos. 4,354,006; 4,419,498 and 4,419,500. These processes involve reacting a polyamine containing at least one tertiary amine group with an allyl halide to quaternize the amine and then reacting the quaternized product with a hypohalous acid to convert allyl substituents to halohydrin moieties. A process disclosed in U.S. Pat. No. 4,520,159 involves reacting a polyaminopolyamide with an allyl halide in aqueous medium to form allyl substituents on tertiary nitrogen atoms, then converting the allyl substituents to halohydrin moieties by reacting them with hypohalous acid at a pH of about 7. Resulting polyaminopolyamide resins, however, are found to be inferior in wet strength performance to those manufactured using epihalohydrin. Additionally, such resins contain residual unreacted epihalohydrin, various dihalopropanols, allyl halides and other by-products which entail further processing for removal. The resins are often dark in color and may require additional crosslinking agents to improve wet strength performance.

These resins are typically produced, transported and stored in aqueous solutions or slurries. The presence of water, however, results in certain undesirable deterioration.

It would be desirable to produce a polyaminopolyamide wet strength resin which contains substantially no epihalohydrin, dihalopropanols, or allyl halide. Advantageously, the resin would be low in color and have wet strength properties at least equivalent to the resins made using epihalohydrins.

Advantageously, the resin could be dried and stored substantially dry then rehydrated or redissolved and used as a wet strength resin. Transport of a dry resin would avoid transport of water. Substantial absence of water would avoid degradations or deterioration such as darkening and loss of activity or solubility associated with reactions in water.

SUMMARY OF THE INVENTION

In one aspect, the invention is a process for making a polyaminopolymer which contains functionality comprising the steps of (a) contacting a polyfunctional amine with an unsaturated alkylating agent under reaction conditions to form an amine/unsaturated alkylating agent adduct; (b) contacting the adduct with a polyfunctional compound such that a polyaminopolymer is formed; (c) contacting the polyaminopolymer with a halogen, hypohalous acid or precursor thereof such that a polyaminopolymer having halohydrin or vicinal dihalo functionality is formed, and either (d) raising the pH of the polyaminopolymer having halohydrin or dihalo functionality sufficiently to cause an increase in molecular weight or between steps (b) and (c) (h) contacting the polyaminopolymer with a crosslinking agent therefor having at least two functional groups reactive with amine groups under reaction conditions to form a crosslinked polyaminopolymer. The invention includes polymers made by such a process, dry, or dissolved polymers prepared by such a process, and the process of drying and/or redissolving such a polyaminopolymer.

Of the polymers, the polyamide formed by reaction of an adduct of polyfunctional amine of the formula:

wherein n is the number of carbon atoms per alkyl unit and m is the number of repeating amine units, with a polycarboxylic acid or derivative thereof reactive with the adduct, is of particular interest. Such polymers of the invention include polymers having repeating units of the formula:

wherein R and R' are independently H or an unsaturated alkyl group from the unsaturated alkylating agent; and Q is a divalent organic group of the dicarboxylic polyfunctional compound wherein at least about 70 percent of R on amine nitrogens are unsaturated alkyl groups.

In the present invention, the halohydrin functionality is suitably converted to other functionality such as an epoxide. Alternatively, during the molecular weight increase, the pH adjustment may convert the halohydrin or dihalo functionality to other functionalities such as epoxide functionalities which are believed to be active sites for inducing wet strength in paper.

There are optionally additional steps in the process of the invention. In a step referred to as (e), between steps (b) and (c), the pH of the polyaminopolymer is optionally lowered. Also, or alternatively, the polyaminopolymer is optionally contacted with an alkylating agent or quaternary amine containing compound after step (b) such that a water soluble quaternized polyaminopolymer is formed, in steps designated as steps (f) and (g), respectively.

The functionalized polyaminopolymer is preferably suitable for use as a wet strength resin in papermaking. Use of such wet strength resins in papermaking and paper made using the resins are also aspects of the invention.

DETAILED DESCRIPTION OF THE INVENTION

In the step of contacting a polyfunctional amine with an unsaturated alkylating agent to form an amine/unsaturated alkylating agent adduct, any polyfunctional amine reactive with an unsaturated alkylating agent is used. Preferably, the adduct formed is one capable of reacting with a difunctional monomer to form a polymeric material. Suitable polyfunctional amines include amines having at least one amine nitrogen atom, preferably at least one amine nitrogen atom having at least one hydrogen atom thereon (primary or secondary amine, hereinafter N-H group which refers to the N-H atom combination in an $NH_x$ group, where x is 1 or 2) at least one other functional group which is reactive with a polyfunctional compound for step (b) of the invention. Such functional groups include N-H, OH, carboxylic ester groups and the like and are preferably N-H or OH, more preferably N-H. Most preferably the polyfunctional amine has from about 1 to about 10, more preferably from about 2 to about 5, most preferably from about 3 to about 4 N-H groups per polyamine molecule. Primary amines are preferred when faster reaction rates are desirable. Amine groups are preferred because they react faster than hydroxyl groups.

The polyfunctional amine is suitably unsubstituted or inertly substituted, that is substituted with groups which do not interfere undesirably with reactions used in forming the polyaminopolymer having functionality, such substituents include quaternary amine, amide, alkyl, cycloalkyl, aralkyl, ether groups and the like. The polyfunctional amine preferably has a total of from about 1 to about 20, more preferably from about 2 to about 10, most preferably from about 4 to about 6 carbon atoms. These are preferred because of ready commercial availability as well as improved solubility and preferred density of reactive sites in resulting polymers.

Suitable polyfunctional monoamines include alkanolamines such as ethanolamine, diethanolamine, propanolamine, dipropanolamine, butanolamine, dibutanolamine, monoisoproanolamine, diisoproanolamine, and the like. Other exemplary monoamines include diallylamine, allylamine and the like.

Suitable polyfunctional polyamines preferably contain at least two active terminal amine nitrogens in which the nitrogen atoms are linked together by $C_nH_{2n}$ groups where n ranges from about 2 to about 10, more preferably from 2 to about 4, and most preferably from 2 to about 3. Such polyamines include polyethylene polyamines, polypropylene polyamines, polybutylene polyamines, hexamethylenediamine, and the like with polyethylene polyamines representing an economically preferred class of amines. Such amine mixtures include linear as well as cyclic and branched isomers and congeners (members of the same family of isomers) of the various amine types.

Thus these preferred polyfunctional polyamines can be represented by Formula I:

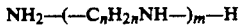

$$NH_2-(-C_nH_{2n}NH-)_m-H$$

wherein n is the number of carbon atoms, an integer, with the preferences previously stated, and m is the number of repeating amine units, an integer, preferably from 2 to about 12, more preferably from about 2 to about 4, most preferably from about 2 to about 3. It is noted that when n is 2, the amine is a polyethylene polyamine; when n is 3, the amine is a polypropylene polyamine; when n is 4, the amine is a polybutylene polyamine.

Suitable polyethylene polyamines include diethylenetriamine, bis-2-hydroxyethyl ethylenediamine, triethylenetetraamine, tetraethylenepentamine, pentaethylenehexamine, hexaethyleneheptamine and higher molecular weight ethyleneamines (polyethylene polyamines) preferably having average molecular weights of from about 200 to about 500 such as those present in products like E-100 commercially available from The Dow Chemical Company, aminoethylpiperazine, hydroxyethylpiperazine, aminoethylethanolamine, bis(3-aminopropyl)ethylenediamine, bis(2-aminoethyl)-1,3-diaminopropane, N,-dimethyl-diethylenetriamine, tris(2-aminoethyl)amine, polyethyleneimine, branched and cyclic isomers or congeners of these amines as manufactured by commercial processes, or mixtures thereof.

Suitable polypropylene polyamines include propylenediamine, bis(3-aminopropyl)amine, bis(3-aminopropyl)-1,3-diaminopropane, or mixtures thereof.

Diethylenetriamine is most preferred because it has a maximum number of functional groups with few carbon atoms and is water soluble; it contains two primary and one secondary amine nitrogens.

The polyamines are suitably contacted with any unsaturated alkylating agent. An unsaturated alkylating agent is an organic compound having at least one double or triple, preferably double, bond, which compound alkylates an amine leaving the unsaturated portion of the alkylating agent on the amine nitrogen. Suitable alkylating agents include unsaturated glycidyl ethers, unsaturated sulfates and unsaturated halides e.g. chlorides, bromides, iodides or fluorides. The alkylating agent is preferably an organic halide which is preferably chloride, bromide or iodide, more preferably a chloride or bromide, most preferably a chloride. The alkylating agent preferably has from about 3 to about 6, more preferably from about 3 to about 5, most preferably from about 3 to about 4 carbon atoms. The unsaturated alkylating agent is suitably unsubstituted or inertly substituted, that is substituted with groups which do not interfere undesirably with reactions used in forming the polyaminopolymer containing functionality, such substituents include hydroxyl, ether, alkyl, aryl, substituted aryl groups and the like.

Preferred unsaturated alkylating agents can be represented by Formula II:

$$RX$$

wherein X is the leaving group exemplified by sulfate, glycidyl groups, and halides, most preferably chloride: and R is the unstaurated organic portion of the alkylating agent which remains on the amine nitrogen. R is preferably an unsubstituted or inertly substituted alkene group of the previously described preferred size. Most preferably, R is an allyl group.

Suitable unsaturated organic halides include allyl chloride, allyl bromide, allyl iodide, 1-chloro-3-butene, 2-chloro-3-butene, 1-chloro-4-pentene, 2-chloro-4-pentene, 3-chloro-4-pentene, 1-chloro-2-butene, 1-chloro-2-pentene, 1-chloro-3-pentene, 3,3-dichloropropene, 3,3,3-trichloropropene, 1,3-dichloropropene, 1,1,3-trichloropropene, 1,2,3-trichloropropene and their bromo and iodide analogs. These compounds are suitably unsubstituted or inertly substituted, that is having substituents which are not undesirably reactive in the hypohalous acid reaction, such as ethers and alkyl groups or any other group which is unreactive to chlorine or hypohalous acid under reaction conditions. Preferred unsaturated organic halides include allyl chloride or allyl bromide with allyl chloride being most preferred.

A ratio of from about 10:1 to about 1:10 of the polyfunctional amine to the unsaturated alkylating agent is advantageously used depending on the conversion rates and selectivity desired. About a 2 to 1 ratio of polyfunctional amine to suitable unsaturated alkylating agent is advantageous such that the excess amine neutralizes amine hydrohalides that are generated as the alkylating agent reacts with the amine. However, a large excess of allyl halide is advantageously used (about 3 or 4 to 1 mole ratio) to increase amine yields if reaction conditions are utilized to control the location of the allyl chloride addition, as is explained in U.S. Pat. No. 3,565,941 (Dick et al.) which is incorporated herein by reference in its entirety. Dick et al. teach that amines containing primary and secondary amino nitrogens can be selectively alkylated on the secondary amino groups using acid blocking for the primary nitrogen by forming an amine salt.

In the synthesis of bis(2-aminoethyl)allyl amine, the pH of the diethylenetriamine solution is controlled to between 5 and 7 to provide maximum selectivity at a reasonable reaction rate. The ratio of diethylenetriamine solution to hydrochloric acid to allyl chloride is 1:2:2. The reaction is preferably run in water. An excess of alkylating agent (allyl chloride) to amine (unlike in the teachings of U.S. Pat. No. 3,565,941) is used to maximize conversion of the amine. Reactor temperature is maintained between about 40° and about 50° C. A large excess of allyl chloride is suitably used in the reaction with polyfunctional monoamines, especially in the presence of an inorganic base such as sodium hydroxide.

The polyfunctional amine and the unsaturated alkylating agent are preferably selected such that the resulting adduct thereof has at least two reactive functional groups reactive with a polyfunctional compound (monomer). Preferably, the adduct has from about 2 to about 3 such reactive groups. Two such groups are sufficient to form a linear polymer. Three are sufficient to achieve desirable crosslinking and/or molecular weight. The reactive groups are preferably amine groups (suitably primary or secondary, preferably primary).

Reaction conditions suitable for contact of the polyfunctional amine with an unsaturated alkylating agent to form a amine/unsaturated alkylating agent adduct are used. Contact preferably takes place at a temperature sufficient for the reaction to take place and below the boiling point of the unsaturated alkylating agent.

The temperature of the reaction depends on the alkylating agent used. In the case of allyl chloride, a temperature of from about 0° C. to about 80° C., more preferably from about 25° C. to about 50° C. is advantageously used at atmospheric pressure. In the use of alkylating agents having unsaturated groups different from allyl groups, the temperature is adjusted to achieve adduct formation but avoid decomposition. Such temperature adjustments are within the skill in the art. Use of iodides and bromides generally allows use of higher temperatures, but because of faster reactions than are observed for the corresponding chlorides, lower temperatures are often advantageous. Higher reactor pressures allow temperatures higher than the atmospheric boiling point of the alkylating agent to be used with corresponding increases in yield and reduced reactor times.

While use of a solvent is unnecessary, solvents are preferred to maintain salt solubility, and achieve moderate to low viscosities. Solvents are also helpful when the amine is blocked to control the reaction. Solvent systems in which the polyamine and alkylating agent are soluble or dispersible and from which the alkylating agent can be separated after the reaction is complete are also suitable. Such solvents include methanol, ethanol, isopropanol, toluene, and blends thereof with water.

Details of such reactions are disclosed, for instance, in U.S. Pat. Nos. 3,051,751 (Levis, et al), 4,096,133 (Zweigle) and in J. Chem. Soc. (C), 1966 pp. 203–208 (Agnew and Parrish) which are incorporated herein in their entireties. In Levis, et al. a 2-p-dioxanone is used to block a primary amine group to form an N-substituted-$\beta$-hydroxyethoxy acetamide group by reaction under substantially anhydrous condition at temperatures of up to about 60° C. In Zweigle, a quaternizing agent such as an alkyl is used to form a polyquaternary ammonium salt by reacting with certain polymers under certain acidic conditions in the presence of a lower alkanol such as methanol. Agnew and Parrish teach formation of allyl derivatives of ethylenediamine and diethylenetriamine followed by separation using ion-exchange chromatography.

When polyfunctional monoamines such as diethanolamine are used, pH control during the addition of alkylating agent is not necessary.

When the polyamine has more than one type of amine group, e.g. primary and secondary amine groups or amine groups which differ in their $pK_b$'s by at least about 2 units, it is useful to selectively block certain amine groups such that the unsaturated alkylating agent reacts selectively with a desired type of amine group. Suitable processes include those disclosed in U.S. Pat. Nos. 3,051,751 (Levis et al.), 3,565,941 (Dick et al.) and J. Chem. Soc. (C), 1966 pp. 203–208 (Agnew and Parrish) which are incorporated herein in their entireties. Particularly, when it is desirable to form the adduct of an unsaturated alkylating agent and a secondary amine group in the presence of primary amine groups, such as in the case of diethylenetriamine, it is useful to adjust the pH of the polyamine from about 4 to about 9, preferably from about 5 to about 7 such as by addition of an acid, preferably an inorganic acid, such as hydrochloric acid, before contacting the polyamine with the unsaturated alkylating agent and to maintain the same pH range with a base, preferably an inorganic base such as sodium hydroxide during reaction of the polyamine with the alkylating agent. A high degree of selectivity is observed within these pH ranges, with increased selectivity in the preferred range.

Reaction times vary depending on pressure, temperature, and unsaturated alkylating agent used. With allyl chloride and diethylenetriamine at atmospheric pressures, the reaction takes about 24 to 36 hours at a temperature of about 45° C.

Similar blocking is also accomplished using certain ketones as taught in J. Chem. Soc. (C), 1966 pp. 203–208 (Agnew and Parrish) which is incorporated herein in its entirety. The advantage of using ketones instead of acids for blocking is that salt formation is minimized with ketone blocking. Also, the ketone is preferably regenerated and recycled during a hydrolysis step that regenerates the substituted amine (amine/unsaturated alkylating agent adduct). Acid blocking methods produce salt as a by product in amounts proportional to the amount of acid and alkylating agent used in the synthesis. The choice between inorganic acid and ketone to block the amines during the amine reaction with the unsaturated alkylating agent is based more on such process considerations than on chemical considerations.

When a relatively pure polyaminopolymer is desired, such as for use as a wet strength resin, it is preferable to purify the amine/unsaturated alkylating agent adduct to remove unreacted reactants and by-products such as unreacted alkylating agent, e.g. allyl chloride, 1-hydroxypropene, and to a lesser extent unreacted polyamine. Unpurified or "crude" polyamines are suitably used but are not usually preferred. Such purification is within the skill in the art. Conveniently, distillation is used as is exemplified in the examples of the invention. Mixtures or blends of the polyamine and polyamine/unsaturated alkylating agent adduct are, however, acceptable and preferred over pure unsaturated alkylating agent adduct to achieve crosslinking as evidenced by gelation and/or molecular weight increase.

In the step of contacting the adduct of the unsaturated alkylating agent and amine with a polyfunctional compound such that a polyaminopolymer is formed, any polyfunctional compound reactive with the adduct is suitably used. Polyaminopolymers include polyaminopolyamides, polyaminopolyesters, polyaminopolyethers, polyaminopolyamines and the like. Preferably, the polyfunctional compound is reactive with terminal functional groups of the adduct. The polyfunctional compound is suitably unsubstituted or inertly substituted, that is substituted with groups which do not interfere undesirably with reactions used in forming the polyaminopolymer containing functionality, suitable substituents include ether, alkyl, aryl groups and the like. The polyfunctional compound preferably has at least 2 reactive groups preferably from about 2 to about 4, more preferably from about 2 to about 3 preferably two functional groups per molecule. These numbers of functional groups are preferred to build linear polymers. The functional groups are suitably the same or different so long as at least two are reactive with the adduct: most preferably the functional groups in a compound are alike, e.g. all carboxylic acid groups.

The functional groups are suitably any group reactive with the adduct, preferably with amine groups thereof, and include carboxylic acid groups, carboxylic ester groups, aldehydes, ketones, halides (particularly acyl halides), ureas, epoxides, acrylates, chloroformates, diketones; α,β- unsaturated (including acryl) acids, esters or aldehydes and the like. The polyfunctional compound preferably has from about 2 to about 12, more preferably from about 4 to about 8, most preferably from about 4 to about 6 carbon atoms. These numbers of carbon atoms help maintain water solubility and a relatively high density of unsaturated groups per molecular weight unit. The polyfunctional compound preferably is linear with at least two terminal functional groups capable of reacting with the polyfunctional amine/unsaturated alkylating agent complex. Suitable polyfunctional compounds include acids such as adipic acid, succinic acid, oxalic acid, glutaric acid, pimelic acid, suberic acid, azelaic acid, sebacic acid, and their halides (acyl halides such as adipyl chloride, glutaryl chloride, succinyl chloride, pimelyl chloride), as well as their methyl and ethyl esters. Blends of the above compounds can also be used to vary the properties of the resulting polyaminopolymer. Anhydrides of the above compounds are also suitable Unsaturated acids such as fumaric acid or maleic acid are suitably used. Alpha, beta unsaturated acids such as acrylic acid, crotonic acid, methacrylic acid, cinnamic acid, sorbic acid, isocrotonic acid, as well as their methyl and ethyl esters such as methyl acrylate are suitable polyfunctional compounds, particularly when the polyfunctional unsaturated organic amine complex contains terminal primary and/or secondary nitrogens. Suitable polyfunctional aldehydes include acrolein, crotonaldehyde, cinnamaldehyde, glutaraldehyde, and the dialdehydes of each of the above mentioned diacids. Suitable dihalides include ethylene dichloride, 1,3-propylene dichloride, 1,4-butylene dichloride, 1,5-dichloropentane, 1,6-dichlorohexane, and the like and their bromides and iodides and fluorides as well as branched versions of the above such as 2,4 dichloropentane and 2,5-dichlorohexane. Formaldehyde, urea and acrylamide and other compounds capable of reacting with at least two, preferably amine, functional groups are also suitable as polyfunctional organic compounds and are capable of polymerization with polyfunctional amine complexes with an unsaturated alkylating agent. Polycarboxylic acids, particularly, dicarboxylic acids such as adipic acid are most preferred. More preferred polyfunctional compounds are diglycolic acids and saturated aliphatic dicarboxylic acids having from about 3 to about 8 carbon atoms.

Illustrative preferred polyfunctional compounds can be represented by Formula III:

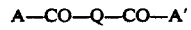

A—CO—Q—CO—A' wherein A and A' are independently OH in the case of carboxylic acids: a halogen, preferably Cl or Br, in the case of carboxylic halides and chloroformates; an unsubstituted or inertly substituted hydrocarbyl group (preferably alkyl, linear branched or cyclic, more preferably of from 1 to about 4 carbon atoms, most preferably methyl or ethyl) in the case of esters: and Q is a divalent organic group of the dicarboxylic polyfunctional compound, which group is unsubstituted or inertly substituted, optionally including ethylenic or other unsaturation such as acrylic or a, b -ethylenically unsaturated acids or derivatives thereof, but preferably alkylene, alkylene ether and/or alkylene ester group (more preferably an alkylene group) of from 1 to about 12 carbon atoms, more preferably of from about 4 to about 8 carbon atoms. In the case of the diglycolic acids, illustrative Q are represented by:

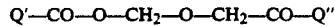

Q'—CO—O—CH$_2$—O—CH$_2$—CO—Q"

wherein Q' and Q" are independently divalent organic groups of dicarboxylic functional compounds as described for Q.

The molar ratio of the polyfunctional amine/unsaturated alkylating agent adduct to the polyfunctional organic compound is preferably from about 0.6 to about 1.4, more preferably from about 0.8 to about 1.2, most preferably from about 0.9 to about 1.1. These ranges produce increasingly desirable high molecular weight polymers. Otherwise unpolymerized materials remain.

Conditions suitable for reaction of the adduct with the polyfunctional compound depend on the type of reaction and are within the skill in the art. For instance, in reactions such as those of amines with carboxylic acid functional groups wherein water or an alcohol is formed, temperatures are preferably sufficiently high to drive off water or alcohol formed during the reaction, preferably from about 140° C. to about 250° C., more preferably from about 160° C. to about 220° C., most preferably from about 180° C. to about 210° C. at about atmospheric pressure, because these temperatures are sufficient to drive the reaction by removal of the water or alcohol. Lower temperatures are suitably used when pressures are below about atmospheric or when e.g. nitrogen purging is used to aid in water removal. The temperature is preferably kept below the boiling point of all components of a reaction mixture until the product is formed. Then the temperature is suitably raised to increase the completeness of the reaction but kept below the temperature at which the amine/alkylating agent adduct decomposes. When the reaction does not involve water production, e.g in reaction of the adduct with methyl acrylate, dimethylglutarate, acrolein, or ethylenedichloride reaction temperatures are preferably lower such as from about 40° C. to about 120° C.

Reactions of polyfunctional compounds with amine-/unsaturated alkylating agent adducts are conveniently run neat, with no solvent. If needed, a high boiling nonreactive solvent such as diethylene glycol dibutyl ether can be used. Other solvent systems are also suitably used, the choice of solvent or solvent system is dependent on the solubility of the individual reactants and resulting polymer chosen for the reaction and is within the skill in the art. A purge, e.g. with nitrogen, suitably removes undesired low molecular weight byproducts of the reaction such as water, methanol, ammonia, ethanol, etc.

The polyaminopolymer contains unsaturated organic functionality from the unsaturated alkylating agent and, if the reaction is run neat, is usually diluted with a suitable solvent (preferably water) before the reactor temperature is lowered to the point that the reactor contents have hardened or increased in viscosity to the point of being difficult to transfer. For instance, in the case of an allyl substituted diethylenetriamine reacted with adipic acid, the product is a solid at room temperature and highly viscous at about 100° C. in the neat form; therefore, water is advantageously added to the reactor and mixed with the reactor contents at 125° C. to maintain the product as a flowable liquid. U.S. Pat. Nos. 3,058,873 (Keim et al.): 3,197,427 (Schmatz); and 3,240,761 (Keim et al.) illustrate such reactions and are incorporated herein by reference To produce a wet strength resin having desirable performance properties such as wet and dry strength and processing/manufacturing properties such as controllable and timely viscosity buildup or crosslinking at room temperature, it is generally preferable to complete the reaction as determined by halide or residual acid number titrations (expressed in milliequivalents (meq.) of potassium hydroxide (KOH) per gram (g.) of sample). The reaction is considered complete when the halide or acid numbers remain constant at reaction temperatures for at least 1 hour or when the halide or acid number reaches some previously selected number. In the case of a polyaminopolymer formed from an amine like allyl substituted diethylenetriamine reacted with a polyfunctional compound such as adipic acid, the reaction is continued until the acid number reaches preferably from about 1 to about 50, more preferably from about 5 to about 15 meq. KOH/g. After the preselected acid number is reached, the reaction medium is preferably cooled and a reagent suitable for quenching the reaction is added, e.g. water in the case of adipic acid reacted with bis(2-aminoethyl)allyl amine, to an acid number of about 10 (neat). In the case of a polyaminopolyamide product, or any other polymer having an inconveniently high viscosity, it is generally convenient to use sufficient water to dissolve the polymer to produce a finished polymer with moderate viscosity.

The amine/unsaturated alkylating agent adducts (hereinafter unsaturated adduct) are advantageously mixed with saturated polyamines having from about 2 to about 4 preferably from about 2 to about 3 amine groups before reacting with the polyfunctional compound. The weight ratio of unsaturated adduct to saturated polyamine is preferably at least about 50 percent by weight unsaturated adduct to 50 percent saturated polyamine: more preferably from about 70/30 to about 100 percent unsaturated adduct: most preferably from about 80/20 to about 90/10: even more preferably from about 85/15 to about 90/10 (all ratios by weight). The presence of the saturated polyamine provides available amino hydrogens for crosslinking and accompanying molecular weight build in reactions subsequent to the hypohalous acid reaction. Such polymers containing from about 10 to about 20 percent by weight amines containing available primary or secondary nitrogens generally greatly decrease the reaction times for adequate molecular weight increase, and are, for that reason, preferred.

Optionally, any of the polyaminopolymers are reacted with alkylating agents such as dimethyl sulfate, methyl iodide, dimethyl carbonate, trimethyloxonium tetrafluoroborate, triethyloxonium tetrafluoroborate, methyltosylate, ethyl tosylate, diethyl sulfate, dimethyl sulfate, ethyl iodide, methyl bromide, ethyl bromide and mixtures thereof. These reagents are believed to generate a quaternary amine in the polymer backbone when they react with a tertiary amine.

Alternatively, the polyaminopolymer is reacted with compounds such as glycidyltrimethylammonium chloride, (2-bromoethyl)trimethylammonium chloride or bromide, (2-chloroethyl)trimethylammonium chloride or other compounds which have a quaternary amine group in the molecule and have groups reactive with the polyamino polymer such as epoxide or alkyl halide groups. These molecules result in cationic (quaternary) character in a branched portion (side chain) of the polyaminopolymer molecule rather than on the backbone thereof.

In either of these optional steps for forming quaternary amine containing polyaminopolymers (quaternization), a molar ratio of alkylating agent to the total theoretical secondary and tertiary amine groups in the polymer is suitably from about 0.05:1 to about 1:1 respectively, with the preferred range being from about 0.1:1 to about 0.5:1 and most preferred from about 0.2:1 to about 0.4:1. Reaction conditions for such alkylations are within the skill in the art. For instance, for alkylation by dimethyl sulfate in water at atmospheric pressure, about 2 hours at about 0° C. followed by about 30 minutes at about 60° C. (to decompose unreacted sulfate) is convenient. A glycidyl alkylating agent conveniently reacts at about 25° C. for several days: water is a convenient reaction medium. Either type of quaternization is suitably performed after step (b) in the process of the invention, preferably after step (b) and before step (c). Since quaternizing increases solubility in water quaternizing early in the process facilitates later steps.

Either quaternary amine containing polyaminopolymers or polyaminopolymers without quaternary groups are suitably reacted with hypohalous acid or halogen. An advantage of using quaternary amine containing polyaminopolymers is that such resins are not as sensitive to pH changes as the polyaminopolymers without quaternary amine groups during synthesis, crosslinking, and use in papermaking.

In the step of contacting the polyaminopolymer with a halogen, hypohalous acid or precursor thereof such that a polyaminopolymer containing halohydrin or dihalo functionality is formed, any hypohalous acid is suitably used. Such acids can be readily generated by any of several methods discussed in U.S. Pat. Nos. 3,578,400 (Wojtowicz et al.), 3,845,145 (Wojtowicz et al.), and 4,520,159 (Maslanku) which are incorporated herein in their entireties. For instance, a hypochlorite salt (such as sodium or calcium hypochlorite) is suitably reacted with carbon dioxide in a small amount of water and a large excess of solvent, preferably a ketone such as methyl ethyl ketone, such that the solvent extracts the hypohalous acid from the water as the acid is formed, leaving halide ions in the water (preferably using a weight percentage of water to solvent of from about 1% to about 10%). Preferably, the hypohalous acid is used as it is generated or is stored in the dark and at cool temperatures such as from about $-5°$ C. to about $0°$ C. and, more preferably, is used within about 48 hours. The hypohalous acid is suitably formed and used in any solvent therefor, more preferably in a solvent which is not soluble in water such as methyl ethyl ketone, acetonitrile, methylacetate, diethyl ketone, isobutyl ketone, ethyl acetate and the like. Such water miscible solvents as acetone are also suitable.

Alternatively, the hypohalous acid is suitably formed by contacting halogen gas, e.g. chlorine with water at a pH of about 7 (e.g. by bubbling the halogen through the water). Alternatively, the hypochlorous acid is suitably formed by contacting halogen gas, e.g. chlorine, with water containing sodium hydroxide, until the pH drops to about 7. The water suitably may have the polyaminopolymer in solution while the water is contacted with the halogen gas. Yet another method involves dissolving a halogen monoxide in water, which may optionally contain the polymer or be mixed with the polymer after an admixture of halogen monoxide and water are formed.

Hypohalous acid is believed to exist in equilibrium with the corresponding halogen, e.g. HOCl with $Cl_2$. The ratio of halogen to hypohalous acid depends on the pH of the solution. For instance, at low pH (about 1 to about 2) the chlorine/hypochlorous acid solution contains about 50 mole percent chlorine relative to hypohalous acid, and at pH 7 it contains mostly hypohalous acid. Thus, if chlorine is bubbled into water at pH 7, the solution formed mainly contains HOCl. Either halogen or hypohalous acid is suitable for use in the practice of the invention, but chlorine is preferred because it is conveniently used in water and is believed to be the reactive species.

The polyaminopolymer is preferably reacted with hypohalous acid in aqueous medium, more preferably with the pH controlled to from about 0 to about 9, more preferably to less than about 7 to avoid reaction of hypohalous acid with amine groups to form haloamines. When the polyaminopolymer is to be used in an application wherein a light color is preferred, the pH is, more preferably, kept below about 3, most preferably from about 1 to about 3. Any acid including formic is suitably used for pH control, preferably it is an inorganic acid such as hydrochloric, nitric, perchloric or sulfuric acid, most preferably a hydrohalic acid: even more preferably, hydrochloric acid (HCl) is used to produce lowest color in a final polyaminopolymer In a preferred procedure, the hypohalous acid is prepared in a solvent, and added to an aqueous solution of the polyaminopolymer, which solution is at a pH of from about 1 to about 3. Thus, the process of the invention is preferably described as having a step (e) between steps (b) and (c) of lowering the pH of the polyaminopolymer having halohydrin or dihalo functionality.

Although any inorganic acid can be used to control pH during the HOCl reaction, it has been found that the use of HCl greatly increases the rate of molecular weight increase of a resulting resin compared to that of resins formed with pH controlled by other acids such as sulfuric acid. Addition of from about 0.01 to about 10, preferably from about 0.1 to about 5, and most preferably from about 1 to about 3 weight percent salt, prior to a crosslinking procedure will also increase the rate of crosslinking of the resin over the rate observed when no salt is used. If salt is added prior to pH adjustment to about 1, other inorganic acids such as sulfuric acid are suitably used. Any chloride salt is conveniently used for this purpose, but alkali metal chlorides are preferred and sodium chloride is more preferred because of availability and effectiveness.

A reaction mixture of unsaturated functionalized polyaminopolymer and hypohalous acid is preferably maintained at a temperature sufficiently low to prevent rapid decomposition of the hypohalous acid, preferably from about $-15$ to about $45°$ C., more preferably from about 5 to about $0°$ C. The temperature is maintained for a reaction time sufficient to allow the hypohalous acid to react to from about 70 to about 100 percent completion, preferably from about 85 to about 100 percent completion, most preferably from about 90 to about 100 percent completion. Running the reaction to relatively higher levels of completion functionalizes the polymer and minimizes residual hypohalous acid. Alternatively, remaining hypohalous acid is preferably removed by means within the skill in the art such as reaction with a bisulfite. Conveniently, such reaction times are for about 2 to 4 hours. After an initial reaction time, the reaction mixture is raised to about room temperature and stirred for a period sufficient to allow the hypohalous acid concentration to reach less than about 0.05 percent by iodometry, as described in the *Standard Methods for the Examination of Water and Wastewater*, 16th ed., American Public Health Association, Washington, DC. 1985, p. 298. If non-aqueous solvents insoluble in water are used in the reaction, the solvents are removed by means within the skill in the art such as flash distillation, vacuum stripping, nitrogen sparging, and/or physical separation; and the resulting halohydrin or dihalo functionalized polyaminopolymer is collected in the aqueous fluids.

To attain maximum reaction of the unsaturation, it is preferable that the molar amount of hypohalous acid used is in approximately equivalent molar proportions relative to the unsaturation in the polyaminopolymer. More preferably, the hypohalous acid is present in a molar amount of from about 90 to about 110% of the molar amount equivalent to the unsaturation. The amount of hypohalous acid should be added to the polymer within a period of about one hour, more preferably within less than about 30 minutes, most preferably within about 15 minutes.

The reaction of a polyaminopolymer with hypohalous acid, a halogen, or a precursor of either is illustrated by the reaction of hypochlorous acid with an allyl functionalized polyaminopolymer. The reaction mechanism of such reactions is not thoroughly understood. This invention is not limited by any proposed mechanism or theory. However, discussion of the reaction is offered to illustrate the reaction and is believed to represent the current known literature as well as analyses of the chemical reactions.

The reaction theoretically results in tertiary nitrogens having halohydrin functionalities as are illustrated by the following structures:

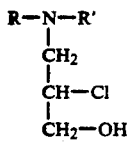
Formula I

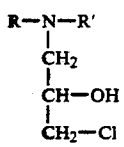
Formula II wherein Cl is a chlorine and R and R' comprise the polyaminopolymer. It is believed that the halohydrin formation is favored at pH ranges of about 5-7. This reaction mechanism is discussed in detail in U.S. Pat. No. 4,354,006, (Bankert) which is incorporated by reference herein in its entirety. According to the literature (e.g. *Handbook of Chlorination*, G. C. White, 2nd edition Van Nostrand, New York, 1986, page 361) at a pH of 2, the equilibrium between hypochlorous acid (HOCl) and chlorine is greater than about 50 percent chlorine. At this pH approximately 50 percent of the HOCl added to the polyaminopolymer is converted to molecular chlorine which then reacts with the allyl functionality to form the chlorohydrins of Formulas I and II and dihalo functional group illustrated by the following formula:

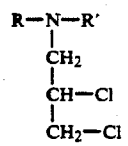
Formula III where Cl is a chlorine atom and R and R' comprise the polyaminopolymer. Halogen groups on adjacent carbon atoms as illustrated in Formula III are referred to herein as dihalo or vicinal dihalo functional groups.

Formation of the dichloro and/or chlorohydrin functionality when the reaction is conducted at a pH of 1.25 is indicated by the following nuclear magnetic resonance (NMR) data: A carbon 13 NMR of a reaction product of the invention formed from an allyl functionalized polyaminopolyamide and HOCl reveals that a mixture of functional groups is produced in the polyaminopolyamide. The NMR spectrum is designed to indicate all carbons with an odd number of protons or hydrogen atoms as negative or down peaks. The chemical composition of the functionalized polyaminopolyamides described is such that only one carbon atom in the polymer contains an odd number of hydrogens. All chemical shifts are in parts per million (ppm) relative to an external tetramethyl silane (TMS) standard in water.

The peaks at 27.4183 and 37.9243 are characteristic of the difunctional carboxylic acid in the polyaminopolyamide backbone. The peaks at 49.1090 and 37.4421 are believed to represent carbons in the polyamino portion of the polymer backbone. The broad peak at 57.4932 represents the allylic carbon from the unsaturated alkylating agent which is converted by HOCl to halohydrin and/or dihalo functional groups.

The remaining peaks in the spectrum are from the two carbon atoms of the now functionalized olefinic group (allyl chloride in this example). These two carbon atoms are attached to hydroxyl and chlorine atoms in three possible combinations. Two peaks at 59.1947 and 60.0775 represent two terminal carbons containing a chlorine atom and adjacent to a carbon with either a chlorine atom or hydroxyl group. A terminal carbon atom containing a hydroxyl group is represented by a peak at 66.1882. All these carbons have 2 hydrogen atoms bonded thereto.

The negative peaks are characteristic of a single carbon atom having one hydrogen and a chlorine or hydroxy group. The two peaks at 58.5035 and around 57 represent adjacent carbon atoms with each with a chlorine atom attached. The remaining peak at 67.8781 represents the carbon atom having a hydroxyl group.

A polyfunctional polyaminopolymer of the invention as depicted is treated with base to build viscosity and form a water soluble crosslinked polyaminopolymer. Then the NMR spectrum is again recorded. The carbon 13 NMR of this polymer reveals backbone carbons remaining unchanged and represented by peaks at 27.4190, 37.4474, 37.9599, and 49.1527. However, all peaks which represent carbon atoms bonded to chloride have disappeared. (Under the reaction conditions, these would be expected to react to form crosslinks and/or epoxides or to be hydrolyzed into hydroxyl groups ) The peaks at 59.2191 and 59.0101 represent carbon atoms attached to a nitrogen atom in the crosslink. New peaks at approximately 67.5 and 68.6333 are believed to represent hydrolyzed carbon atoms formerly having chlorine substituents now having hydroxyl groups or epoxides, and thus, shifted downfield.

A carbon 13 spectrum of a commercial water soluble polyaminopolymer (commercially available from Hercules Incorporated under the tradename Kymene™ 557) shows clear structural differences from the polyfunctional polyaminopolymer. The backbone carbons are similar with the peaks at 26.5124, 27.3495, 36.0645, 36.1852, 37.9933, and 48.6721 representating dicarboxylic acid and polyaminopolymer groups in the backbone. Two peaks at 60.6449 and 62.2148 represent carbons (from the epichlorohydrin) involved in crosslinking and, thus, attached to nitrogen atoms.

A very notable difference between the sample of Kymene™ 557 polyaminopolymer and the polyfunctional polyaminopolymer of the invention is that the Kymene™ 557 polyaminopolymer contains azetidinium functional groups as revealed by characteristic peaks at 61.6237 and 75.5836. These peaks correspond to those reported in U.S. Pat. No. 4,341,887 which reports peaks at 59.8 and 75.0 (Example 4, page 5, line 45) for the two types of carbons in the azetidinium functional group.

Polyaminopolymers of the present invention advantageously do not have this functional group.

Polyaminopolyamides of the invention are preferably crosslinked such that the viscosity increases preferably at least about 5 percent as measured with a Brookfield Viscometer, #2 spindle at 60 rpm (revolutions per minute). Crosslinking is controlled such that the gel point is not reached so that the polymer remains water soluble; more preferably the viscosity increases from about 5 percent to about 300 percent. Crosslinking is suitably accomplished by means within the skill in the art and, preferably, by means outlined herein. Curing accelerators and crosslinking agents are suitably used. When the polyaminopolymer contains dihalo or halohydrin functionality, increasing the pH results in molecular weight increase attributed to crosslinking.

The pH of a polyaminopolymer having a halohydrin or dihalo functionality is preferably raised sufficiently to cause an increase in molecular weight as indicated by viscosity increase. The pH is conveniently raised from about 0 to about 3 (a pH from the step of reacting a hypochlorous acid with e.g. allyl functionality) to from about 5 to about 11 for a period of time sufficient to increase the molecular weight of the polymer. Preferably, various functional groups present (e.g. halohydrins) are also converted to reactive functional groups (believed to be epoxides) before being applied to pulp solutions. The increase in molecular weight associated with the increased pH allows optimum wet strength performance. Either organic or inorganic bases can be used to raise the pH to from about 4 to about 10, more preferably to from about 5 to about 8, most preferably to from about 6 to about 7. These ranges allow increasingly controlled molecular weight increases while maintaining resin solubility (in water). The polyaminopolymer is preferably water soluble to an extent of at least about 1 weight percent resin in the water, more preferably at least about 10 weight percent. Bases which are suitably used include alkali metal hydroxides, carbonates and bicarbonates, calcium hydroxide, pyridine, trimethylamine, tetramethylammonium hydroxide, benzyltrimethylammonium hydroxide, triethanol amine and mixtures thereof.

During a pH increase to build molecular weight, the halohydrin and/or dihalo functionalities are believed to react via several mechanisms. One example involves the reaction of secondary or tertiary amino groups with the halohydrin or dihalo functional groups to form amino crosslinking. Another example would include conversion of the halohydrin functionality to epoxide functionality using, e.g. a base such as sodium hydroxide, and, optionally, further reaction of epoxides with available amino hydrogens to build molecular weight as well as provide further sites for reaction with pulp/paper during drying procedures. In the presence of tertiary nitrogens, epoxide functionalities are believed to react among themselves to form ethers, a reaction believed to be one of the crosslinking mechanisms when e.g. bis(2-aminoethyl)allylamine is used in the synthesis of a polyaminopolymer. Tertiary nitrogens may react with the halohydrin and/or the dihalo to form quaternary nitrogens during crosslinking. Yet another alternative reaction is that of dihalo functionalities reacting with available amino groups (primary and secondary and tertiary) in a polymer to build molecular weight.

Once the desired molecular weight is achieved through crosslinking, the resin is preferably stabilized to prevent gelation. To stabilize the polymer, water is added to dilute the resin further and the pH is reduced to from about 6, preferably from 5, most preferably from a pH of about 5 to a pH of from about 2 to about 3, preferably from a pH of about 4 to a pH of about 3. This pH reduction is suitably accomplished by addition of formic, sulfuric, nitric, perchloric, hydrochloric acids and the like, preferably hydrochloric acid.

A curing accelerator or crosslinking agent to assist in molecular weight buildup and subsequent viscosity increase is optionally added to the polyaminopolymer having halohydrin or dihalo groups. Suitable accelerators and crosslinking agents include polyfunctional compounds capable of reacting with the polyaminopolymer. Curing accelerators advantageously employed in this invention include aliphatic and aromatic polyamines such as ethylenediamine: propylenediamine: butylenediamine: 1,6- hexanediamine: o-, m-, and p-phenylenediamine: 3,3'- biphenyldiamine: 1,2,3-benzenetriamine; tripropylenetetramine; triethylenetetramine: diethylenetriamine; heptaethyleneoctamine: 2,3-diamino- 2-methylbutane: and the like. Alkanolamines are also, suitably used as curing accelerators. Examples of suitable monoalkanolamines include monoethanolamine, monoisopropanolamine, N, N-diethylethanolamine, and the like. Examples of suitable diethanolamines include diethanolamine, diisopropanolamine, N-methyldiethanolamine, N-phenyldiethanolamine, and the like. Other suitable curing accelerators include aminoethylpiperazine, aminoethylethanolamine, hydroxyethylpiperazine, N,N-diethylethylenediamine, and the like. Polymeric curing accelerators include the reaction products of polyfunctional acids of esters having from about 2 to about 10 carbons, including adipic, and glutaric acids or their esters with polyfunctional amines such as those useful in the practice of this invention.

Alternatively, crosslinking is accomplished before reaction with hypohalous acid or halogen. A polyaminopolymer is prepared from the amine/unsaturated alkylating agent adduct and the polyfunctional compound as previously described and then a crosslinking agent reactive with amine groups is used. Suitable crosslinking agents are any compounds reactive with two positions on the polyaminopolymers, preferably compounds having two reactive groups such as two halogen atoms, more preferably an alkyl compound (preferably of from 2 to about 6, more preferably of from 2 to about 4 carbon atoms) having at least two, most preferably two, halogen atoms. While bromine is the preferred halogen atom because it reacts at lower temperatures than does a corresponding chlorine atom, chlorine atoms are also useful in the practice of the invention. Exemplary crosslinking agents include 1,2-dichloroethane succinyl chloride, malonyl chloride and corresponding bromine compounds, preferably 1,3-dichloropropane or 1,3-dibromopropane, most preferably especially for use in drying and redissolving, 1,3-dibromopropane. The crosslinking agent is suitably used in any amount sufficient to produce crosslinking, preferably sufficient crosslinking to achieve the desired viscosity, but when used as a paper additive preferably insufficient viscosity to form a gel, more preferably sufficient crosslinking agent to produce from about 3 to about 18 percent crosslinking is used, this corresponds to from about 1.5 to about 9.0 mole percent crosslinking agent based on secondary amine groups in the polyamino polymer. The crosslinking agent is reacted with the unsaturated polyaminopolymer under conditions within the skill in the art for such reactions, such as temperatures preferably from about 20° C. to about 80°

C., more preferably from about 20° C. to about 50° C., at any convenient pressure, advantageously atmospheric pressure. Because the polyaminopolymer is often in water as produced, water is an advantageous solvent for the crosslinking, but is unnecessary: other solvents for the polymer and the reactants are suitable.

Crosslinking before reaction with the halogen, hypohalous acid or precursor thereof is advantageous for product stability. The crosslinks are alkyl linkages rather than a beta hydroxy amine linking structure and are, therefore, more stable at low pH such as a pH below about 3.0. Such polymers are more stable, for instance, when stored, particularly because storage conditions suitable for avoiding additional crosslinking through the chlorohydrin or epoxide functionality, advantageously those of pH below about 3.5, are not optimum for stability of polymers containing epoxide functionality (advantageous for retention on paper) for storing polymers having beta hydroxy amine functionality, both of which hydrolyze at the indicated pH.

Use of a crosslinking agent to react with the polyaminopolymer produced from the amine/unsaturated alkylating agent adduct and the polyfunctional compound, also allows control of the amount of crosslinking and, thus, control of the molecular weight. Thus, high molecular weight resins such as those having molecular weights equal to or greater than about 100,000 are suitably prepared by the process of the invention. Alternatively, or additionally, preselected amounts of unsaturation are left remaining in the polymers so that the polymers are suitable in applications requiring unsaturation such as curing by UV (ultraviolet) or electron beam radiation.

Such a crosslinked polyaminopolymer is suitably further functionalized to form the halohydrin or any other desired functionality, such as by reactions previously discussed to quaternize the polymer and/or to form halohydrin or dihalo functionality. A particularly stable polymer having dihalo or halohydrin functionality is formed by reacting the crosslinked polyaminopolymer with halogen, hypohalous acid or precursor thereof as described previously. Such a polymer is advantageously quaternized by either of the discussed methods before reaction with the halogen, hypohalous acid or precursor thereof. Quaternization using an alkylating agent such as dimethyl sulfate is noted to proceed at a pH higher than about 5.6, most preferably a pH of about 9, for maximum quaternization. The higher pH allows base reaction with hydrohalides (for example, HCl, HBr) formed during crosslinking using a haloalkyl compound. When a polymer is crosslinked and then reacted with halogen, hypohalous acid or a precursor thereof, the step of raising the pH of the polyaminopolymer having halohydrin functionality or vicinal dihalo functionality sufficiently to cause an increase in molecular weight is optional. While the pH increase is optional, it is desirable to raise the pH, preferably to from about 5 to about 11, more preferably to from about 7.5 to about 10.5, for a period of from about 5 or about 10 minutes to several hours) before addition to wood pulp to cause epoxide formation from the halohydrin functionality. Epoxide groups are believed to react with the pulp, and improved wet strength is observed. Because the polymer becomes more active with pulp, the process of raising the pH is referred to as "base activation".

Thermosetting polyaminopolymers produced in the practice of the invention can be used as such or can be further reacted to form useful derivatives such as for antistatic polymers, crosslinking agents for carboxylated lattices, and the like. Suitable reactions are within the skill in the art such as illustrated by U.S. Pat. No. 4,520,159, especially Example 5 thereof.

The polymers can be applied to paper or other cellulosic products by spraying, dipping, tub application, and the like, and the cellulosic products subsequently dried with or without heat, preferably with heat, to crosslink the polymer until it becomes insoluble in water. Resulting cellulosic products have increased wet and dry strength over products prepared by the same processes from the same fibers but without the polyaminopolymers; therefore, resins prepared by this invention are suitable for use in impregnating paper such as wrapping paper, bag paper, and the like to impart both wet and dry strength. The polyamino-polymers are preferably present in amounts of from about 0.1 to about 5 percent by weight based on weight of cellulosic product, preferably paper.

The preferred method of adding polymers prepared by this invention to paper is by internal addition to the pulp solution prior to sheet formation. Diluted or concentrated resin solutions can be added to a pulp stock (pulp concentration will vary, preferably at pulp concentrations above 0.5, more preferably from about 1 to about 2 percent by weight) at any suitable stage before sheet formation (sheeting). Such stages include in the beater, stock chest, Jordan engine, fan pump, head box, etc. After a resin is added, a pulp is formed into sheets and dried according to practices in the art.

Paper formed with the resins prepared by the practice of this invention advantageously have sufficient wet strength to be suitable for most applications as it comes off the paper machine, referred to in the industry as "off-the-machine." As paper continues to cure, wet strength development continues to increase to some maximum, usually after about 2 to about 4 weeks. Post curing of the paper after the cure at room temperature by heat treating the sheets at temperatures from about 50° C. to about 150° C. for from about 10 to about 120 minutes also increases wet and dry strength properties of the paper because of further crosslinking.

Resins prepared by practice of this invention are suitably added to a pulp stock in conjunction with other additives such as other wet or dry strength agents, starch, carboxymethylcellulose, and the like to further improve wet and dry strength performance of the paper. Other paper additives may also be used in conjunction with resins prepared according to the practice of this invention to further improve other paper properties.

Polyaminopolymers, particularly polyaminopolyamides, produced by the practice of the invention have several advantages over similar polyaminopolymers produced either by reaction of epichlorohydrin with polyaminopolyamides or by reaction and subsequent functionalization of unsaturated alkylating agent with polyamides. Any unreacted unsaturated alkylating agent is easily removed from the amine/alkylating agent reaction mixture, eliminating unreacted low molecular weight alkylating agents (particularly low molecular weight halides such as epichlorohydrin, allyl chloride, 1,3 dichloro-2-propanol) from the final product, thus reducing concern about possible environmental and/or toxicity effects. Preferably, there is no measurable quantity of low molecular weight halide (e.g. molecular weight less than about 200) or epihalohydrin in the product polyaminopolymer. Polyaminopolymers produced by the practice of the invention advantageously provide better wet and dry strength at polymer loadings of from about 0.1 to about 5, preferably from about 1 to about 3 percent by weight based on weight of paper compared to commercially available wet strength resins. At concentrations of from about 1 to about 5 percent by weight, the wet strength as measured by the procedure of TAPPI Standards T205 and T220 is preferably increased by at least about 200% as compared to a similar paper prepared by the same process using the same fiber or pulp stock but without polyaminopolymers. By adjusting the amount of unsaturated amine in the polymer backbone as well as controlling temperature and chloride ion concentration, the reaction synthesis can be easily controlled to prevent gelation during the molecular weight buildup (crosslinking) step. By adjusting the pH to about 2 before the hypohalous acid reaction, resins having much lower color are produced with excellent wet and dry strength properties.

The method of this invention also has the advantage of allowing regulation of the percentage of unsaturation desired in the polymer by controlling the proportion, if any, of saturated amine used with the amine/unsaturated compound adduct for crosslinking. Also, one can control whether unsaturation is attached to a secondary or tertiary amino group by selecting a particular amine/unsaturated compound adduct. Current commercial methods rely on random reaction of e.g. epichlorohydrin or unsaturated alkylating agent with the secondary and tertiary amines already in the polymer. Thus, these current methods provide less control of polymer characteristics.

An additional benefit of the present invention is the ability to produce substantially linear polyaminopolymers when bifunctional compounds such as pure bis(2-aminoethyl) allyl amine are reacted with a difunctional acid or other difunctional compound. Bis(2-aminoethyl) allyl amine has only two terminal primary reactive amino groups capable of reacting with the diacid, resulting in a linear polyaminopolyamide. Current practice in the art is to react polyfunctional polyamines, such as diethylenetriamine which has three reactive sites capable of reacting with the diacid, to produced branched polyaminopolyamides when the secondary amino groups react with the diacid functional group. These can result in lower molecular weight products As an example, the weight average molecular weight for commercially available Kymene ™ 557 polyaminopolymer is approximately 6600 as determined by gel permeation chromatography (GPC) using a polypropylene glycol standard. The GPC has a column packed with Spherogel TSK, 2000 P. W. commercially available from Varian Associates, Inc. and employs an eluent of 0.1M ammonium acetate in 1:1 weight ratio of methanol and water at a flow rate of 0.5 ml/min and a temperature of 40° C. The sample resin is injected at a concentration of 1 weight percent in an injection volume of 50 $\mu$l (microliters) using a propylene glycol standard and a ultraviolet (UV) detector. A finished wet strength resin prepared according to the practice of this invention from the reaction of 96.8% pure bis(2-aminoethyl)alkylamine with adipic acid and further reacted with HOCl produces a product with a weight average molecular weight of 11,900, almost two times greater than the commercially available product.

It has been found that resins prepared by the designated process are particularly advantageous when dried and redissolved. This is contrary to observations made using commercially available wet strength resins which generally do not redissolve when dried. For use in a redissolved state, preferred resins of the invention, are those crosslinked by contacting the polyaminopolymer with a crosslinking agent therefor having at least two functional groups reactive with amine groups such that a crosslinked polyaminopolymer is formed, preferably where the crosslinking agent is an alkyl compound having from 2 to about 6 carbon atoms and at least 2 halogen atoms selected from chlorine or bromine, more preferably bromine, most preferably 1,3-dibromopropane. The resins are suitably dried by any means within the skill in the art such as by air drying (flowing dry air over resin) at atmospheric pressure or under vacuum. Adding a water soluble solvent (e.g. acetone) to polymer solution to cause the resin to precipitate. Resin is collected and solvent removed in the manner water is removed, but preferably by air or nitrogen drying. Drying takes place at any temperature sufficient for removal of water at a desirable or predetermined rate, preferably at a temperature greater than about 25° C. for convenient water removal at about atmospheric pressure: more preferably, the drying temperature is from about 25° C. to about 110° C., most preferably from about 25° C. to about 60° C. Pressure used is dependent on temperature, in that lower pressures advantageously allow water removal at lower temperatures. Any pressure at which water is removed is suitable. Because of the heat stability of the resins of the invention, atmospheric pressure can be used and is particularly advantageous because special pressure equipment is not required.

The dried resins of the invention are novel because, unlike other wet strength resins which cannot be redissolved after drying or lose activity as wet strength resins, they can be rehydrated or redissolved and remain useful as wet strength resins. Preferably, resins of the invention remain sufficiently active as wet strength resins that papers made with such resins which have been dried and redissolved or rehydrated have at least about 80 percent of the wet strength of the same paper made with the resin before drying and redissolving or rehydrating: more preferably the wet strength is at least about 90 percent of that of a comparable paper; most preferably 100 percent.

Dried resins of the invention are preferably dried sufficiently to become processable (that is to be bagged or otherwise placed in containers e.g. as a powder). Becoming processable involves loss of stickiness that would otherwise result in clumping. More preferably the resins are dried to a dryness of at least about 90 percent, most preferably at least about 95 percent as measured by differences in initial weight and dried weight. While it is recognized that incidental or tightly bound water may be present under these conditions, resins dried to such an extent are referred to herein as "substantially dry." Such dried resins preferably have less than about 20, more preferably less than about 10, most preferably less than about 5 weight percent water. This amount of water contrasts with commercially available wet strength resins which are supplied in aqueous solutions having from about 12.5 to about 35 weight percent solids (resin) and correspondingly from about 87.5 to about 65 weight percent water.

The dried resins are suitably redissolved or rehydrated, preferably redissolved, by any means within the skill in the art which contacts the resin with water such that dissolution occurs. Preferred means of redissolving or rehydrating include stirring in sufficient water to make a solution of predetermined solids concentration (usually 12.5 to 25 percent solids), preferably at about 20°-30° C., until solution is homogeneous. After being redissolved, the resins are advantageously used as wet strength resins as described for the resins before drying or as is within the skill in the art. Use as a wet strength resin generally involves incorporating said resins into paper.

A preferred embodiment of the invention is the polyamide formed by reaction of a polyfunctional amine of Formula I:

$$NH_2-(-C_nH_{2n}NH-)_m-H$$

and an unsaturated alkylating agent of Formula II: RX, (both as previously defined) with a polycarboxylic acid or derivative thereof reactive with the adduct of Formula III:

$$A-CO-Q-CO-A'$$

which polyamides have repeating units of Formula IV:

$$[-R'N-(-C_nH_{2n}NR-)_m-CO-Q-CO-]$$

wherein R and R' are independently H or an unsaturated alkyl group from the unsaturated alkylating agent: and Q is a divalent organic group of the dicarboxylic polyfunctional compound (polycarboxylic acid or derivative), as defined in Formula I and Formula III, respectively. Advantageously, the process of the invention results in such polyamides having at least about 70 percent of R on amine nitrogens being unsaturated alkyl groups. The term amine nitrogens refers to nitrogen atoms having alkyl and/or hydrogen substituents rather than carboxyl (C=O) substituents, the latter being referred to herein as amide nitrogens (R'). Preferably the amine nitrogens correspond to secondary nitrogens and amide nitrogens correspond to primary nitrogen in the starting amine. Previously known methods of preparing polyamides having similar repeating units produce polymers having a lower degree of substitution on the amine nitrogen atoms. The higher degree of substitution is advantageous because polyamides having greater than about 70 percent substitution exhibit good wet strength properties. Additionally, such high degrees of substitution, and corresponding high percentages of tertiary nitrogens, render quaternization easier (because converting secondary nitrogen to quaternary nitrogen requires two alkylations of the nitrogen. Preferably, at least about 70, more preferably at least about 80, most preferably at least about 85 but preferably less than about 95 percent of the R are unsaturated alkyl groups. In the most preferred embodiment, n is 2, m is 2, R is allyl ($-CH_2CH=CH_2$), and Q is $C_4H_8$. The molecular weight of polymers having repeating units represented by Formula IV produced by steps (a) and (b) of the invention is preferably increased through employment of steps (c) and (d) and/or (h) of the invention as already described. After steps (c) and (d) and/or (h) of the invention, the polymers also have repeating units of Formula IV, but they also have cross linking.

Advantageously, such polymers having a high degree of substitution of unsaturated groups on the nitrogen atoms are also the product of a process comprising the steps of: (q) contacting an amine of Formula I with a dicarboxylic acid or derivative thereof of Formula III under reaction conditions to form a polyamidopolymer thereof (r) in an aqueous medium with maintenance of a pH of at least about 11. Contacting the resulting polyamidopolymer with greater than a mole equivalent based on amine nitrogens of an alkylating agent of Formula II under reaction conditions to form the reaction product of the alkylating agent with the polyamidopolymer having unsaturated groups (corresponding to R) on at least about 70 percent of the nitrogen atoms in the polyamidopolymer and (c) contacting the polyaminopolymer with a halogen, hypohalous acid or precursor thereof such that a polyaminopolymer having halohydrin or vicinal dihalo functionality is formed, and either (d) raising the pH of the polyaminopolymer having halohydrin or dihalo functionality sufficiently to cause an increase in molecular weight or between steps (r) and (c) steps (h) contacting the polyaminopolymer with a crosslinking agent therefor having at least two functional groups reactive with amine groups under reaction conditions to form a crosslinked polyaminopolymer. The invention includes polymers made by such a process, dry, or dissolved polymers prepared by such a process, and the process of drying and/or redissolving such a polyaminopolymer. Conditions effective for steps (c), (d) and (h) are those previously described, while those effective for steps (q) and (r) are those disclosed in U.S. Pat. No. 4,520,159 except that the pH of the aqueous medium in step (r) is at least about 8, preferably at least about 9 more preferably at least about 10, most preferably at least about 11. The pH is suitably raised by adding any basic material sufficient to achieve these PH's, preferably by adding alkali metal hydroxide in solid or, more preferably by adding sodium hydroxide most preferably in solution form, advantageously of about 50 weight percent concentration.

Additionally, greater than a molar equivalent of alkylating agent based on amine nitrogens is preferably used, more preferably at least about a 50 percent mole excess, most preferably at least about a 100 percent mole excess is used. All of steps (e), (f) and (g) are optionally used with the method comprising steps (q), (r), (c) and (d) or (h), hereinafter Method II. As in the method comprising steps (a)-(c) (hereinafter Method I), step (e) is preferably used and preferably takes place before step (c). Processes additionally incorporating a quaternization step, preferable step (f) are preferred embodiments of the invention, to form resins imparting high wet strengths to paper.

The following examples are given to illustrate but not limit the invention. All percentages and parts are by weight unless otherwise indicated. Examples (Ex.) of the invention are designated numerically, while comparative samples (C.S.) are designated alphabetically.

REPRESENTATIVE EXAMPLE

To produce an amine/unsaturated alkylating agent adduct, diethylenetriamine (DETA) is alkylated with allyl chloride using procedures detailed in U.S. Pat. No. 3,565,941 (Dick et al.) which is incorporated herein by reference in its entirety. Into a 5 liter reactor equipped with stirring, reflux condenser, heating lamp, pH probe, and temperature controller, is added 1000 g. (9.7 moles) of DETA and 500 g. of water. Sulfuric acid (about 300 g) is added dropwise to the stirred DETA/water mixture until the pH of the solution is approximately 7.0. The temperature controller is set to 40° C. and the reactor contents are allowed to equilibrate to 40° C. Over a period of 48 hours, approximately 1500 g. of allyl chloride is added to the reactor in 250 ml. increments periodically while maintaining the pH between 5 and 8. Sodium hydroxide (NaOH) (50 weight percent in water) is used to raise the pH periodically to keep the reactor contents between a pH of 5-8. The reactor contents are allowed to continue reacting until about 50-55 percent by weight of the mixture in the reactor is bis-(2-aminoethyl) allylamine as determined by area counts via capillary gas chromatography on a DB-5 capillary GC. Continued reaction is possible with conversions up to 60 percent by weight, but the time required is exceptionally long. At the end of the digesting phase, the reactor contents are heated to 90° C., and the residual allyl chloride is removed by sparging with nitrogen for 3 hours. After removal of the allyl chloride, the reactor content's pH is increased to 12.5 with 50 percent by weight solution of NaOH. The product is filtered to remove salt (NaCl).

A crude mixture of allyl substituted diethylenetriamine (DETA) is obtained with the following composition: DETA - 17.4 percent, bis(2-aminoethyl)allylamine, - 53.8 percent, 1-allyl DETA - 5.3 percent, 1,2-diallyl DETA - 13.5 percent, and 1,3-diallyl DETA - 2.9 percent. (All percentages are determined by area counts from GC tracings.) By distillation, the desired bis(2-aminoethyl)allylamine is recovered to a purity level of about 97 percent area count. The product also contains about 0.7 percent area count DETA and about 1.4 percent area count 1-allyl DETA.

Into a reactor, equipped with stirring and heating means, a water trap/condenser and a nitrogen sparge, is introduced an amine/unsaturated alkylating agent adduct, and a dicarboxylic acid and a solvent, if desired. The mixture is heated, with stirring, to a temperature within the range of from about 165° to about 210° C. Nitrogen sparging is begun to remove the water produced by the condensation reaction. The reaction is allowed to proceed until a test of the polymer product produces an acid number in the range of 5-15 as measured by titration with potassium hydroxide to a phenophthalein end point. The product is then cooled to a temperature of about 100° C. and diluted with water to a solids content of about 50 percent by weight as measured by removal of volatiles by heating to at least about 100° C. until a constant weight is achieved. Viscosity measurements are made using a Brookfield viscometer Type LVT, using a #2 spindle at 60 rpm, commercially available from Brookfield Laboratories, Inc.

EXAMPLE 1

PREPARATION AND CROSSLINKING OF POLYAMINOPOLYAMIDE

A mixture of 98 grams (g) bis(2-aminoethyl) allyl amine and 19 g diethylenetriamine are placed in a reaction vessel equipped with an air driven stirrer, thermometer, water trap/condenser, and a nitrogen sparge tube. With rapid stirring, 125 g adipic acid is added to the amine mixture. After the adipic acid has dissolved in the amine mixture, the resulting solution is heated to 200° C. with continuous sparging for 165 minutes, at which time the hydroxyl number of the polyaminopolyamide is 10. The solution is slowly cooled to 125° C. when 220 g water is added. The solution is stirred for several more hours until a clear homogeneous solution is obtained. There is, thus, provided a polyaminopolyamide solution which contains 47.7% solids.

Ninety-nine (99) g of the polyaminopolyamide is mixed with 150 g water and 22 g sodium chloride. The resulting solution is cooled to 3° C. using an ice bath. Then concentrated hydrochloric acid is added to the solution until the pH is 1.25. To this is added, over a ten minute period, 155 g of a 5.58 percent by weight hypochlorous acid solution in methyl ethyl ketone. After addition, the solution is stirred at 5° C. for 3 hours, then allowed to warm to 25° C. and stirred for an additional 12 hours. An aqueous solution of a halohydrin/dichloro functionalized polyaminopolyamide containing 28.9 percent by weight solids is obtained.

A 5M (molar) sodium hydroxide solution is added slowly with rapid stirring at 25° C. to 40 g of the polyaminopolyamide to form a solution having a pH of 4.72. The solution viscosity is measured from an initial value of 31 cP (centipoise) using a Brookfield viscometer type LVT at 60 rpm (revolutions per minute) with spindle #2.

After 3 hours, when the viscosity reaches 56 cP, 7 g of the solution are added to 4 g water and concentrated hydrochloric acid (HCl) is added until the pH is 2.3 to stabilize the resin. The resulting solution contains a water soluble crosslinked polyaminopolyamide with a solids content of 18.3 weight percent.

The remainder of the polyaminopolyamide continues to react, crosslinking in the presence of the hydroxide to reach higher viscosities which are monitored. At viscosities of 100, 180 and > 1000 cP, additional samples are collected and treated (quenched) with water and HCl as described for the first (56 cP) sample.

EXAMPLE 2

PREPARATION AND CROSSLINKING OF POLYAMINOPOLYAMIDE

A polyaminopolyamide is prepared from 110 g bis(2-aminoethyl) allyl amine and 110 g adipic acid according to the procedure described in Example 1, except that the polyaminopolyamide solution is heated at 200° C. for 4 hours, cooled to 125° C. and diluted with 195 g water to give a polyamide solution containing 49.8 percent by weight solids and an acid number of 9.7.

Comparison of peaks at δ 54.7 and δ 50.18 ppm from tetramethylsilane on a 13C NMR of the product show about 97 percent substitution of unsaturated alkyl on amine nitrogens.

One hundred one (101) g of the solution of polyaminopolyamide is mixed with 150 g water to form a mixture which is stirred until homogeneous, then cooled to 3° C. using an ice bath. The pH of the clear solution is then adjusted to 1.25 with concentrated hydrochloric acid. After an initial rise in temperature, the solution is returned to 3° C. and maintained at that temperature.

To prepare hypochlorous acid (HOCl), 460 g methyl ethyl ketone and 60 g water are combined to form a solution. The solution is cooled to 0° C. using an ice water/sodium chloride bath. Carbon dioxide is sparged into the solution at a rate of about 2 SCFH (standard cubic feet per hour at atmospheric pressure and 60° F.) (equivalent to about $1.57 \times 10^{-5}$ m3/s at 16° C.) throughout each of the following calcium chloride additions (about 1 hour). Then, with rapid stirring, 20 g (by weight) increments of calcium hypochlorite are added every 15 minutes for a total of 80 g. After the last calcium hypochlorite addition, the solution is stirred at 0° C. for 15 minutes. Then the upper methyl ethyl ketone layer is collected and contains 6.1 percent by weight HOCl.

With rapid stirring and cooling, 127 g of the 6.1 percent hypochlorous (HOCL) solution in methyl ethyl ketone is added to the polyamide solution over 60 minutes, and the solution is maintained at 3°-5° C. The solution is then stirred at 5° C. for 150 minutes: then the temperature is allowed to rise to 25° C., after which the solution is stirred for an additional 15 hours while the 25° C. is maintained. Residual HOCl concentration in the solution is measured as 0.0 percent by iodometric titration as described in *Standard Methods for The Examination of Water and Wastewater*, 16th ed., American Public Health Association, Washington, DC. 1985, p. 298. The solution is poured into a separatory funnel, and the lower aqueous layer is collected and purged with nitrogen for 24 hours to remove any unreacted methyl ethyl ketone, leaving an aqueous solution of polyaminopolyamide halohydrin and/or dichloro groups with a solids content of 23.9 percent by weight.

To 70 grams of the 23.9 percent solids solution is added 10 grams of water to make a solution having about 21 percent solids. The solution is stirred at 25°-30° C. Five molar (M) NaOH is added dropwise until the pH of the solution is 5.18. Viscosity increase is monitored. After 96 hours, when a viscosity of 80 cP is reached, water is added and the pH is adjusted to 2.8 with concentrated HCl to afford a solution of 16.3 weight percent polymer (resin) in water.

Bleached Kraft pulp (50 percent by weight hardwood — 50 percent by weight softwood) is beaten in water with a pH of 6.45 and a conductivity of 2.8 micromhos as measured using a conductivity meter to a Canadian standard freeness of 495 cc as measured by the procedures of TAPPI Standard T227. A portion of the resin is diluted to 1 percent by weight solids in water. The resin solution is added in an amount equal to a 1 percent by weight loading level based on weight of solid resin (in the solution) to a stirred stock solution containing 0.125 percent by weight of the paper pulp. The pH of the pulp solution is then adjusted with dilute NaOH to a pH between 7.0 and 7.5. The pulp is then immediately formed into 6 inch (15 cm) diameter handsheets, each weighing about 1.25 grams. The handsheets are then cured in an oven at 80° C. for 30 minutes prior to testing. The wet tensile strength of the paper is measured according to the procedures of TAPPI Standards T205 and T220, after each handsheet is soaked in distilled water for 30 minutes at 25° C. Both wet and dry strength are measured on a Mullens burst tester according to the procedure of TAPPI Standard T220.

Wet tensile strength is 9.49 psig (pounds per square inch gauge) (65.43 $10^3$ Pa guage). As compared with the wet tensile strength of a paper made from the same pulp using the reference resin of 5.24 (36.13 $\times 10^3$ Pa guage) psig. Concentrations of the resin of the invention and the reference resin in the paper are 1 percent by weight in pulp.

EXAMPLE 3

PREPARATION AND CROSSLINKING OF A POLYAMINOPOLYAMIDE

A polyaminopolyamide is prepared as in Example 1 but using 119.5 g adipic acid and 114 g of a mixture of 85 percent bis(2-aminoethyl) allyl amine and 15 percent diethylenetriamine. The polyaminopolyamide has an acid number of 14.3. It is diluted with 205 g water to give a solution having 50.93 percent by weight solids.

To 100 g of the polyaminopolyamide solution is added 150 g water. The solution is cooled to 3° C. using an ice bath. Hydrochloric acid is added until the pH is 0.8, then 136 g of a 6.6 weight percent HOCl solution in methyl ethyl ketone is added over a period of 20 minutes. The solution is stirred at 3° C. for a period of about 4 hours then allowed to slowly warm to 20° C. over 15 hours. The resulting halohydrin/dichloro functionalized polyaminopolyamide solution is placed in a separatory funnel, where it separates into layers. The lower (water) layer is collected and purged with nitrogen for 24 hours to produce a 22.9 percent by weight solids solution of the polymer.

To 75 g of this functionalized polyaminopolyamide solution is added 10 g water. With rapid stirring and at 25° C., 5M sodium hydroxide (NaOH) is added until the pH is 6.66. The solution then has a viscosity of 33 cP, measured as in Example 1. Several samples were collected as in Example 1 with the time required to reach a given viscosity, the pH of the stabilized sample, and the percent solids of each sample noted in Table 1.

TABLE 1

| Resin # | Reaction Time (min.) | Solution Viscosity (cP) | Stabilized pH | Percent Solids |
|---|---|---|---|---|
| 1 | 15 | 33 | 3.0 | 12.2 |
| 2 | 30 | 33 | 2.9 | 12.4 |
| 3 | 45 | 33 | 3.0 | 11.9 |
| 4 | 60 | 40 | 2.8 | 12.1 |
| 5 | 85 | 95 | 3.0 | 12.2 |
| 6 | 90 | >1000 | 2.44 | 15.0 |

The data in Table 1 shows the reaction times at which viscosity increases occur.

EXAMPLES 4-7

The following examples are illustrative of the invention when used as a wet strength additive to paper. Controls are paper which contains no wet strength additive and with a reference wet strength resin which is a commercially available sample of Kymene ™ 557 polyaminopolymer (the age of the resin from the manufacture date is noted). All concentrations are at 1 percent by weight loading levels on the paper, based on weight of the paper unless noted otherwise.

EXAMPLE 4

USE OF CROSSLINKED POLYAMINOPOLYAMIDES IN PAPER

Samples of the resins from Example 3 are evaluated in paper in comparison with the reference polyaminopolymer (60 days old) at one percent concentration.

The paper making procedure of Example 2 is repeated using a portion of each sample resin from Example 3 diluted to 1 percent by weight solids in water. The resin solution is added in an amount equal to a 1 percent by weight loading level based on weight of solid resin (in the solution) to a stirred stock solution containing 0.125 percent by weight of the paper pulp, and the pH of the pulp solution is then adjusted as in Example 2. The pulp is formed into sheets, cured and tested as in Example 2.

TABLE 2

| Resin Sample | Wet Burst Strength (psig) | Dry Burst Strength Tensile (psig) | Wet Strength (Kg/m$^2$) | Dry Burst Strength (Kg/m$^2$) |
|---|---|---|---|---|
| CONTROL* A | 2.1 | 39.7 | 1477 | 27913 |
| RESIN 1 | 5.1 | 45.1 | 3586 | 31710 |
| RESIN 2 | 7.25 | 45.4 | 5097 | 31921 |
| RESIN 3 | 10.6 | 48.3 | 7453 | 33960 |
| RESIN 4 | 11.7 | 50.5 | 8226 | 35507 |
| RESIN 5 | 11.4 | 52.1 | 8015 | 36632 |
| RESIN 6 | 8.2 | 46.9 | 5765 | 32975 |
| Reference* B | 5.9 | 44.4 | 4148 | 31218 |

*Comparative Sample Not an example of the invention.

The data in Table 2 shows improved wet strength and dry strength of the resins of this invention compared to commercial resins and Control A with no resin. The resins of this invention at a viscosity of between about 45 and 90 cP provide almost 2 times the wet strength of Reference B. Also important is the wet strength obtained with no apparent viscosity increase (Resins 1, 2 and 3) of the resins of this invention.

EXAMPLE 5

USE OF CROSSLINKED POLYAMINOPOLYAMIDES IN PAPER

A sample of the resin prepared in Example 1 with a viscosity of 180 cP is tested as a wet strength additive on paper as compared with a reference sample using Kymene TM 557 polyaminopolymer which is less than 60 days old at the concentrations indicated in Table 3 as References C, D and E. Both the resin from Example 1 and the reference sample are diluted with water to 1 percent by weight solids. These resins are added to pulp slurries containing 1.25 percent by weight pulp prepared from 50 percent by weight Federated hardwood and 50 percent by weight Espanol softwood in water of Canadian freeness 495 cc (measured as in Example 4), a pH of 6.7 and a hardness of 75 ppm as measured by the Hach titration method for total hardness as described in *Standard Methods for The Examination of Water and Wastewater*, p. 209, and expressed as calcium carbonate.

The resins are added at different concentrations. Each pulp slurry is stirred for five minutes after the resins are added before dilution to 0.125 percent by weight pulp in water. The pH of each resulting pulp slurry is adjusted with dilute NaOH to between 7.0 and 7.5. Handsheets are then prepared as in Example 4. Wet and dry strength results are measured as in Example 4 and are shown in Table 3.

TABLE 3

| Resin Sample | Resin Concentration in Pulp (%) | Wet Burst Strength (psig) | Dry Burst Strength (psig) | Wet Burst Strength (Kg/m$^2$) | Dry Burst Strength (kg/m$^2$) |
|---|---|---|---|---|---|
| Resin 7: Example 1 (180 cPs) | 0.25 | 3.1 | 35.7 | 2180 | 25101 |
| Resin 8: Example 1 (180 cPs) | 1.0 | 7.0 | 39.4 | 4922 | 27702 |
| Resin 9: Example 1 (180 cPs) | 3.0 | 16.0 | 44.2 | 11250 | 31077 |
| Reference* C | 0.25 | 4.4 | 34.1 | 3094 | 23976 |
| Reference* D | 1.0 | 5.9 | 35.6 | 4148 | 25030 |
| Reference* E | 3.0 | 5.8 | 34.7 | 4078 | 24398 |

*Comparative Sample Not an example of the invention

The data in Table 3 shows the effect of resin concentration on wet strength as compared with commercially available samples (References C, D, E) in water containing 75 ppm (parts per million) calcium carbonate (CaCO$_3$). Higher resin concentrations give higher wet strengths. The increase in wet strength with concentration does not level off or drop for the polyaminopolymer of the invention as it does for the reference polymer.

EXAMPLE 6

USE OF POLYAMINOPOLYAMIDES IN PAPER

The resin sample from Example 1 taken at a viscosity of 180 cP is tested as a wet strength additive using the procedure of Example 5 except for the following differences 1) Canadian freeness of pulp is 500 cc: (2) the water used does not contain measurable hardness: (3) resin concentrations in pulp are 0.25 and 0.5 percent by weight as indicated in Table 4. Results are shown in Table 4.

TABLE 4

| Resin Sample | Resin Concentration in pulp (%) | Wet Burst Strength (psig) | Dry Burst Strength (psig) | Wet Burst Strength (Kg/m$^2$) | Dry Burst Strength (kg/m$^2$) |
|---|---|---|---|---|---|
| Resin 10 | 0.25 | 4.3 | 40.0 | 3023 | 28124 |
| Resin 11 | 0.50 | 7.0 | 37.9 | 4922 | 26648 |
| Reference* F | 0.25 | 6.3 | 46.5 | 4430 | 32694 |
| Reference* G | 0.50 | 6.3 | 44.4 | 4430 | 31218 |

*Comparative Sample; not an example of the invention.

The data in Table 4 shows wet strength of a resin of this invention as compared with a commercially available product at 2 concentration levels. Again the data shows the wet strength resin of this invention continues to increase with concentration rather than plateauing between 0.25 and 0.5 percent by weight in the paper.

EXAMPLE 7

USE OF A CROSSLINKED POLYAMINOPOLYAMIDE IN PAPER

A crosslinked polyaminopolyamide prepared from 88% bis(2-aminoethyl) allyl amine and 12% diethylenetriamine reacted with adipic acid having an acid number of 6.9 is prepared according to the procedure of Example 1. A sample of this resin with a viscosity of 50 cP is used as a wet strength additive according to the procedure in Example 4, except that the paper is cured at 25° C. for 4 weeks instead of at 80° C. for 30 minutes. Paper prepared using a reference sample of Kymene ™ 557 polyaminopolymer that is less than 3 months old is also cured at 25° C. for 4 weeks. Resin concentration in the pulp is at 1 percent by weight loading levels. Results are shown in Table 5.

TABLE 5

| Resin | Wet Burst Strength (psig) | Dry Burst Strength (psig) | Wet Burst Strength (Kg/m$^2$) | Dry Burst Strength (Kg/m$^2$) |
|---|---|---|---|---|
| Example 7 | 6.4 | 45.4 | 4500 | 36921 |
| Reference* H | 4.2 | 41.9 | 2953 | 39460 |

*Comparative sample, not an example of the invention.

The data in Table 5 shows that the resins of this invention are equally capable to or better able to increase the wet and dry strength of paper naturally aged/cured (at room temperature).

EXAMPLE 8

PREPARATION OF A POLYAMINOPOLYAMIDE HAVING QUATERNARY AMINE FUNCTIONAL GROUPS

A polyaminopolyamide is prepared as in Example 1 using adipic acid and a polyamine (85% 2-allyl diethylenetetraamine/15% diethylenetetraamine) with a final acid number of 13.8 and a solids content of 50.1 weight percent. Into a 500 ml flask equipped with an air stirrer, thermometer and addition funnel, is placed 50.1 g of the polyaminopolyamide solution and 78 g of water. The resulting solution is chilled to 2° C. using an ice bath. With rapid stirring, 1.95 ml of dimethyl sulfate is added to the solution over a period of approximately 10 minutes. The solution is then stirred at 2°-4° C. for 4 hours. During this time, 50% NaOH is added at intervals of 30 minutes to maintain a pH of about 9. After 4 hours, the solution is heated to 65° C. for 1 hour and then cooled to obtain 128 grams of a quaternized polyaminopolyamide containing unsaturated functionality. The polyaminopolyamide has increased solubility in water at elevated temperature and elevated pH levels, both as compared with a corresponding unquaternized polyaminopolyamide.

To 100.8 g of this quaternized polyaminopolyamide, at 2° C. and with stirring, is added concentrated HCl until the pH is 1.5. Then, at 2°-5° C. over a period of 10 minutes, 70 g of a 5.37 percent by weight HOCl solution in methyl ethyl ketone prepared as described in Example 2 is added. After addition of the HOCl, the solution is stirred for 15 hours as the temperature is allowed to slowly warm to 25° C. The solution is then placed in a separatory funnel, and the lower aqueous layer collected and purged for 12 hours with nitrogen to remove any unreacted methyl ethyl ketone. A chlorohydrin functionalized polyaminopolyamide with a solids content in water of 26.9 percent by weight is obtained.

To 30 g of the polyaminopolyamide, is added 10 g by weight water. The pH is adjusted with 5M NaOH to 6.1, and the viscosity monitored using a Brookfield viscometer using #2 spindle at 60 rpm. At 48 cP, 20 g of the polymer solution is added to 12 g water, and the pH is adjusted to 3 using a 1:2 solution of sulfuric acid to water. The solids content is 12.67 percent by weight as measured by weighing the polymer after solvent removal by heating in an oven at 120° C. for an hour.

The sample remaining after the 30 g used previously are removed continues to react in the presence of the hydroxide until the viscosity reaches 110 cP, at which point 12 g of water are added. The pH is adjusted to 3.4 using a solution of 1:2 sulfuric acid and water. A solids level of 14.59 percent by weight is achieved.

These two wet strength resins are compared with a reference sample of Kymene ™ 557 polyaminopolymer in water at the concentrations shown in Table 6. The pulp used in this test is 50 percent by weight Simpson hardwood and 50 percent by weight Simpson softwood which is beat to a freeness of 490 as measured by TAPPI Standard T-227. The conductivity of the water used is 1600 micromhos as measured using a conductivity meter, and the pH is 6.87.

TABLE 6

| Resin | Concentration in Pulp % | Wet Burst Strength (psig) | Dry Burst Strength (psig) | Wet Burst Strength (Kg/m$^2$) | Dry Burst Strength (Kg/m$^2$) |
|---|---|---|---|---|---|
| Reference* J | 0.25 | 1.67 | 46.38 | 1174 | 32623 |
| Example 8 (@110 cPs) | 0.25 | 1.07 | 48.15 | 752 | 33854 |
| Reference* K | 0.50 | 2.95 | 46.00 | 2074 | 32343 |
| Example 8 (@110 cPs) | 0.50 | 2.57 | 47.10 | 1807 | 33116 |
| Reference* L | 1.00 | 5.40 | 50.24 | 3797 | 35323 |
| Example 8 (@110 cPs) | 1.00 | 5.50 | 50.15 | 3867 | 35260 |
| Reference* M | 3.00 | 15.81 | 55.07 | 11116 | 38720 |
| Example 8 (@48 cPs) | 3.00 | 18.51 | 54.02 | 13014 | 37981 |
| Example 8 (@110 cPs) | 3.00 | 19.87 | 55.37 | 13971 | 38952 |

*Comparative Sample; not an example of the invention.

The data in Table 6 shows the performance of quaternized polymers of this invention compared to the reference resin at various concentrations. At concentrations greater than 1 percent by weight in the paper, the resins of this invention out perform the commercially available reference resin.

EXAMPLE 9

This example illustrates adding a pendant quaternary amine group to the polyamide.

A 30 g sample of the polyaminopolyamide prepared in Example 3, but before reaction with HCl or HOCl, and 45 g of water are placed in a flask and stirred to form a solution. To this stirred solution is added, at 25° C., 1.36 g of glycidyltrimethylammonium chloride. The solution is stirred for 24 hours.

In the procedure of Example 3, for addition of HCl, HCl is added to the solution until the pH is 1.8. Then 74 g of 3.99 weight percent HOCl solution in water are added to the solution over 10 minutes. The resulting product is 31.1 weight percent solids.

In the procedure of Example 3, 15 g of the solution are admixed with 7 g of water. The pH is adjusted to 5.65 with 5M NaOH. At a viscosity of 80 cP, the reaction mixture is added to 13 g water, and the pH is adjusted to 2.96 with concentrated HCl to give a product containing 13.35 weight percent solids.

EXAMPLE 10

The procedure of Example 9 is repeated except using 28.1 g of the polyaminopolyamide of Example 3 and 42 g of water. To this solution is added, at 25° C., 2.55 g of glycidyltrimethylammonium chloride. The solution is stirred at 25° C. for 4 days.

An amount of 15 g of the solution and 7 g water are mixed. The pH is adjusted to 5.76 with 5 M NaOH. At a viscosity of 80 cP, 13 g water are added and are observed to lower the viscosity. The resin is allowed to continue reacting until a viscosity of 75 cP is reached. Then, the pH is lowered to 2.75 with diluted sulfuric acid (1:2 ratio of acid to water). The final product is a 13.5 weight percent solids solution. Wet Strength Measurements on resins of Examples 9 and 10

Wet strength measurements are conducted as in Examples 4 and 6 except (1) Canadian freeness of pulp is 480 cm$^3$ and (2) resin concentration in pulp is 1 percent by weight.

TABLE 7

| Resin | Wet Burst Strength (psig) | Dry Burst Strength (psig) | Wet Burst Strength (Kg/m$^2$) | Dry Burst Strength (Kg/m$^2$) |
|---|---|---|---|---|
| Example 8 | 4.02 | 51.3 | 2826 | 36069 |
| Example 9 | 5.02 | 52.2 | 3530 | 36702 |
| Reference* N | 5.47 | 48.0 | 3846 | 33749 |
| C.S.* Q | 1.19 | 44.5 | 837 | 31288 |

*Not an example of the invention.

The data in Table 7 show that papers made using polyaminopolyamides of the invention have good wet and dry burst strengths.

EXAMPLE 11

PREPARATION OF POLYAMINOPOLYAMIDE, WET STRENGTH RESIN AND PAPER THEREFROM

This example illustrates the use of esters in the preparation of wet strength resins.

Into a 500 ml flask equipped with air stirrer, nitrogen bubbler tube, and Dean Stark trap is placed 76.9 grams of 99.1 percent of bis (2-aminoethyl)allyl amine (allyl DETA) and 9.68 g diethylenetriamine (DETA) to make an 85 percent 2-allyl DETA/15 percent DETA mixture (solution). To this stirred solution is added 100 g of the following ester mixture:

| | |
|---|---|
| Dimethyl Glutarate | 66 percent |
| Dimethyl Adipate | 16.5 percent |
| Dimethyl Succinate | 16.5 percent |

The reaction mixture is heated at 120° C. for 5 hours: then the temperature is raised to 135° C. and maintained for 1.5 hours, then raised to and maintained at 150° C. for 30 minutes during which time methanol is collected in the trap. The solution is cooled to 100° C., and 150 g water is added to the solution. The resulting unsaturated polyamide is 50.36 percent solids and had a viscosity of 87 cP (KPa.s).

Preparation of Wet Strength Resin

Into a 500 ml flask is placed 31.4 g of the above polyamide and 50 g water. The solution is cooled to 3°–5° C. in an ice bath and 76 g of a 4.33 percent HOCl solution in Methyl Ethyl Ketone (MEK) is added over 5 minutes after which the solution is stirred overnight as the ice is allowed to melt. The next morning no residual HOCl is present according to the procedure used in Example 2. The solution is placed in a separatory funnel, the lower aqueous layer collected and purged overnight with nitrogen to remove MEK. Then the resin solution is stored at 25° C.

Two days later 60 g of the resin solution is diluted with 65 g water, and 5M NaOH is added to raise pH to 10.33. This indicates that by using an ester mixture, one can use a pH much higher than used for resins prepared using adipic acid without causing precipitation of the resin. To use this pH with adipic acid resins, the resin must be quaternized.

Resin pH is maintained between 10 and 10.5 with 5M NaOH and viscosity is monitored. After about 3 hours, viscosity is 76 oP (kPa*s). At that point, concentrated HCl is added to lower the pH to 3.1 and 30 g of resin solution is removed and diluted with 15 g water to provide Resin A. Into a 25 ml volumetric flask is placed 2.28 g of Resin A, and the flask is filled to the 25 ml mark to give a 1 percent solids solution in water.

Paper (Ex. 11) is prepared from Resin A as in Example 2 and wet strength is compared to a commercial wet strength resin, indicated as Reference R.

TABLE 8

| Resin | Concentration in pulp (percent) | Wet Burst Strength (psig) | Dry Burst Strength (psig) | Wet Burst Strength (Kg/m$^2$) | Dry Burst Strength (Kg/m$^2$) |
|---|---|---|---|---|---|
| Ex. 11 | 1 | 10.45 | 53 | 7347 | 37264 |
| Reference* R | 1 | 14.3 | 54 | 10054 | 37967 |
| Control* (no additives) | 1 | 2.08 | 50 | 1462 | 35153 |

*Not an example of the invention.

The data in Table 8 show that practice of the invention using ester starting materials produces resins which impart good strength to paper.

EXAMPLE 12

PREPARATION OF POLYAMINOPOLYAMIDE, WET STRENGTH RESIN AND PAPER THEREFROM USING BROMINE

The following example illustrates the use of a halogen, bromine (Br$_2$), instead of HOCl.

A polyaminopolyamide is prepared as in Example 1 except that the acid number is 9.8 and the solids level in the resulting solution is 51.44 percent.

To 25.8 g of polyaminopolyamide solution is added 40 g water. The resulting solution is cooled to 3°-5° C. in an ice bath, and 2.5 ml dimethyl sulfate is added. After 2.5 hours of stirring at 3°-5° C., the solution is warmed to 25° C. and stirred overnight. The next morning, 2.37 ml of bromine at 25° C. is added over 5 hours. The resulting solution is stirred overnight to give a bromohydrin functionalized polyaminopolyamide. Nuclear magnetic resonance spectroscopy (NMR) identified by $^{13}C$ having peaks 46.35 ppm (carbon having bromine atoms and 61.29 ppm (carbon having hydroxy group of bromohydrin) from tetramethyl silane internal standard To 30 g of the above product, is added 11 g water to make a 20 percent solids solution to which is added 5M NaOH sufficient to raise the pH to 6.18. After 2 hours, sufficient 5M NaOH is added to raise the pH first to 6.5 and then, 30 minutes later, to 6.22 from the pH of 5.78 which results from reaction. After another 2 hours, viscosity had increased from 24 cP (kPa.s), to 39 cP (kPa.s); then concentrated HCl is added to lower the pH to 3.46. A sample of 8.9 g water is then added to give Resin B. Final resin solids content is 16.63 percent. A sample of 1.68 ml of Resin B is placed into a volumetric flask which is filled to the 25 ml mark to make a 1 percent solids resin solution in water.

The resin is tested for wet strength by making paper (Ex. 12) according to the procedure of Example 2. Results of the testing of the paper and a comparison with a paper made using a commercial wet strength resin, designated Reference S, are given in Table 9.

from 8.0 to 5.6. The resulting crosslinked, unsaturated polyamide had a solids level of 16.3 weight percent. (hereinafter Resin C)

Into a flask is placed 64 g of Resin C and 64 g water to make an 8 percent solids resin solution. The solution is cooled to 3°-5° C. using an ice bath. The pH is raised to 9 using 5M sodium hydroxide. Then 1.56 ml of dimethyl sulfate is added. The solution is stirred for 2.5 hours at this temperature and then warmed to 25° C., and maintained for a period of 30 minutes. This gives quaternized resin D in water.

To all of the quaternized Resin D is added concentration HCl to lower pH to about 1.75. Then 50 g of a 3.98 weight percent HOCl solution in methyl ethyl ketone is added at 3°-5° C. The solution is stirred overnight at this temperature, then warmed to 25° C., after which 5M NaOH is added to raise the pH to 1.6. the solution is then sparged overnight with nitrogen to remove the methyl ethyl ketone (MEK). The resulting chlorohydrin containing product is pale yellow and clear. (hereinafter Resin WSR-D1).

This resin can be added directly to pulp as a wet strength resin. Alternatively, the resin can be treated with a base raise pH for additional crosslinking. As an example of such additional crosslinking, sufficient 15 M aqueous NaOH is added to raise the resin solution pH to 5.44 which is maintained for 1 hour, after which the resin is added to pulp for testing (designated Resin WSR-D2).

Resin C is reacted with HOCl in the same procedure used for Resin D to produce a nonquaternized chlorohydrin resin (WSR-C) which is not base activated (not treated with base).

Papers are prepared by the procedure of Example 5

TABLE 9

| Resin | Concentration in pulp (percent) | Wet Burst Strength (psig) | Dry Burst Strength (psig) | Wet Burst Strength (Kg/m$^2$) | Dry Burst Strength (Kg/m$^2$) |
|---|---|---|---|---|---|
| Ex. 12 | 1 | 11.6 | 58.4 | 8156 | 41060 |
| Reference* S | 1 | 13.48 | 59 | 9478 | 41483 |
| Control* (no additive) | 1 | 1.63 | 54 | 1146 | 37965 |

*Not an example of the invention.

The data in Table 9 show that a halogen is suitably used in place of a hypohalous acid in the practice of the invention to make a resin which imparts good strength to paper.

EXAMPLE 5

PREPARATION AND CROSSLINKING OF A POLYAMINOPOLYMER AND SUBSEQUENT REACTION WITH HYPOHALOUS ACID AND PAPER THEREFROM

A polyaminopolymer is prepared as in Example 1, but using 77.3 g bis(2-aminoethyl) allyl amine, 22.7 g DETA, 111.1 g adipic acid and heating at 190° C. for 4.5 hours to an acid number of 24, followed by 175 ml of water. The polyaminopolymer is diluted to 54.5 percent solids in water and had an acid number of 24. To 30 g of the clear yellow polymer solution is added 1.5 ml of water and 0.4 ml of 1,3-dibromopropane. The solution is heated using a reflux condenser at 50° C. for 5 hours. Viscosity had from 75 cP (KPa.s) to 202 cP (KPa.s) measured (at 25° C. by the procedure outlined in Example 1). The solution is cooled to 25° C. and stirred overnight at this temperature. Viscosity the next morning is 390 cP (KPa.s). Then 55 g water is added to the resin, followed by sufficient concentrated HCl to lower pH using the resins indicated in Table 10 and wet strengths are measured as in Example 2.

TABLE 10

| Resin Tested | Wet Strength (psi) | Wet Strength (Kg/m$^2$) |
|---|---|---|
| Control (no additives)* | 1.17 | 823 |
| Reference T (Commercial)* | 18.04 | 12684 |
| WSR-C | 6.35 | 4465 |
| Control (no additives)* | 1.11 | 780 |
| Reference U (Commercial)* | 18.31 | 12874 |
| WSR-D1 | 10.56 | 7424 |
| WSR-D2 | 16.85 | 11847 |

*Not an example of the invention. The commercial resin was not quaternized. Variation between the two control and commercial references indicate the amount of variation resulting from variations in the paper making process.

The data in Table 10 that the practice of the invention even without optimization can produce a wet strength resin which is 92 percent as effective as a commercial resin but does not use and therefore, cannot be expected to contain, epichlorohydrin or its hydrolysis products.

The resins in Table 10 are stored at rom temperature for 2 weeks and then retested.

An additional sample of Resin WSR-D1 is stored at pH 2.6 for the 2 week period. Then Resin WSR-D3 is prepared from resin WSR-D1 by the reaction with HOCl and subsequent pH lowering by the same procedure used to prepare Resin WSR-B2. Then papers are prepared and measurements of wet strength made as for Table 10. Results are shown below:

TABLE 11

| Resin Tested | Wet Strength (psi) | Wet Strength (Kg/m$^2$) |
| --- | --- | --- |
| Control (no additives)* | 1.66 | 1167 |
| Reference V (Commercial) | 12.46 | 8761 |
| WSR-D1 | 8.22 | 5779 |
| WSR-D3 | 11.22 | 7889 |

*Not an example of the invention. Reference V was the same commercial resin used in the same amount as in Reference T and U.

The data in Table 11 shown no loss in wet strength as a percentage of the Reference after 2 weeks. Resins prepared in previously examples often exhibit less storage ability than those prepared in Example 13 wherein the resin is crosslinked using a polyfunctional compound reactive with amine groups before reaction with HOCl.

EXAMPLE 14

USE OF A DRIED RESIN

The procedure of Example 13 is repeated except that 177.1 g of bis(2-aminoethyl)allylamine (96.2% pure), 30 g DETA, 220 g adipic acid at 200° C. with slowly purging nitrogen are used. The solution is cooked to an acid number of 9.8 at which point the solution is cooled to 130° C. 380 g water is added and the solution is stirred overnight without heating. The polyamide Product (14A) is 51.44% solids.

A 30 g sample of Product 14A, 15 g water and 0.4 ml of 1,3-dibromopropane are placed in a flask which is then stoppered and stirred for 7 days at 25° C. at which point viscosity has increased from 85 cP to 315 cP. To the resulting solution is added 15 g water to lower viscosity to 82 cP, and stirring is continued another 4 days at 25° C. Viscosity has increased to 385 cP. Then 30 g water is added with 3 drops of concentrated HCl. Viscosity is 77 cP at 17.12% solids (Product 14B).

A 30 g sample of Product 14B and 30 g water are placed in a flask to form a solution. The solution is cooled to 3°-5° C., concentrated HCl is added to lower the pH to 2.0. Then 33 g of a 3.41 weight percent HOCl solution in methyl ethyl ketone is added over 5 minutes. The solution is stirred in the dark overnight, then purged with nitrogen using a sparging tube to produce Product 14C (16.65% solids).

3 g sample of Product 14C is placed into a aluminum weighing dish. Similarly for a comparative sample (Reference W) a 3 g of a commercial, epichlorohydrin based resin, is placed into a separate aluminum weighing dish. The dishes are heated to 110° C. and maintained at that temperature for 2 hours. The resulting solids are placed in water (5 ml). Product 14C dissolved in less than 1 minute to produce Product 14D. The commercial resin (Reference W) does not dissolve with stirring for 1 hour.

The redissolved Product 14C is tested as a wet strength additive for paper by the process of Example 2.

TABLE 12

| SAMPLE | WET STRENGTH (psig) | Wet Strength Kg/m$^2$ |
| --- | --- | --- |
| Control* A (no additives) | 0.8 | 562.6 |
| Product 14D (redissolved) | 6.42 | 4,515 |
| Product 14C | 7.99 | 5,619 |
| Reference* W | 12.7 | 8,931 |

*Not an example of the invention. Reference W

These results indicate that a wet strength resin of the invention can be converted into a solid (dried) redissolved and provide wet strength at least 80% that of a fresh resink, whereas the commercial resin could not be dried and redissolved for use.

EXAMPLE 15

PREPARATION OF POLYAMIDOPOLYMER HAVING HIGH DEGREE OF SUBSTITUTION FROM DIETHYLENETRIAMINE AND ALKYLATING AGENT FOLLOWED BY POLYMERIZATION

Into a 5L flask is mixed 1040 g of diethylenetriamine and 1200 g of water. With stirring, concentrated sulfuric acid is added (dropwise) until the solution pH is 7.0 at 25° C. Then over 2 hours, 950 ml of allyl chloride is added and the mixture is heated to and maintained at 45° C. for 3 days. During this time the pH is readjusted every 2 hours (except overnight) with 50 percent NaOH solution to maintain a pH of about 6.5-7.1. Unreacted allyl chloride is distilled off and the pH adjusted with 50 percent NaOH to 12.83. Solids in the flask are removed by filtration. The filtrate is distilled to remove most of the water. Precipitation of more salt is noted and the salt is filtered off. The resulting filtrate is distilled to obtain 690 g of bis(2-aminoethyl) allyl amine with a purity of greater than 99 percent.

Into a 1L flask is placed 204 grams of 95 percent bis(2-aminoethyl) ally amine and 32 grams of diethylenetriamine to make an 85 percent unsaturated amine mixture. To this stirred solution is added 255.8 grams of adipic acid. The solution is heated and stirred at 195° C. until the acid number is 13.8, then the reaction mixture is cooled to 130° C., 440 grams of water is added, and the solution is stirred overnight at 30° C. The solids level is 50.14 percent of unsaturated polyamide B.

Carbon 13 NMR spectra of the product shows very little absorbance at 50.18 ppm relative to tetramethylsilane (TMS) which is indicative of very little carbon adjacent to unsubstituted nitrogen. A much larger peak is noted at 54.7 ppm corresponding to carbon adjacent adjacent to unsubstituted nitrogen. A much larger peak is noted at 54.7 ppm corresponding to carbon adjacent to substituted nitrogen. Integration of the peaks indicated about 85 percent substitution on the nitrogens of this polymer (corresponding to percentage of alkyl substituted DETA used).

Into a flask is placed 40.1 g of unsaturated polyamide B and 60 g of water. The resulting solution is cooled to less than 3° C. (using an ice bath), and the pH is adjusted to 2.1 with concentrated HCl. Then 76.5 g of 4.7 percent HOCl solution prepared as for EXAMPLE 2 is added over a period of about 50 minutes. The solution is stirred at 3° C. for 2 hours. Then the ice is allowed to melt, and the solution is stirred overnight. The next morning, the residual HOCl is less than 0.02%. The solution is then placed into a separatory funnel, the lower aqueous layer collected and sparged overnight with nitrogen. The product (B1) is 4.90 percent solids.

To 30 g of B1 is added enough water to make a 22 percent solids solution. Then sufficient 5M NaOH is added dropwise at 25°-30° C. to raise the pH to 5.95. Viscosity is monitored, and after 31 minutes, viscosity is 115 cP. 21 g water is added and pH is lowered to 3.8 using concentrated HCl. The final wet strength resin (Example 10) is 12.9 percent solids and has a Gardner color of 4 measured as for Example 11.

COMPARATIVE EXAMPLE X

A POLYAMIDOPOLYMER PREPARED BY ALKYLATING A POLYAMIDE AT A PH OF GREATER THAN 7

Into a flask is charged 154.8 grams of diethylenetriamine (DETA) and 219.2 grams of adipic acid (1.5 moles each) and the mixture heated to 167° C. until acid number is 11.1. At this point the reaction is cooled and allowed to sit. The next morning, 150 ml of water is added to form an admixture, which is then stirred at 100° C. until the resulting solution si homogeneous. The solution is then cooled and 140 ml of water are added to make a 50.5 percent solids polyamide solution A.

Into a flask is charged 215.48 grams of polyamide solution A and 470.4 grams water. The resulting solution is stirred at 20°-25° C. and 38.25 grams of allyl chloride (99.5 percent pure) is added over about 30 minutes. The solution is heated to 45° C. for 5 hours and then cooled to room temperature. A vacuum is applied to the solution to remove unreacted allyl chloride. The product (A1) is 21.28 percent solids.

Into a flask is placed 525 g of methyl ethyl ketone (MEK) and 75 g water. The solution is cooled to less than 3° C., carbon dioxide bubbled into the solutions, and 80 grams of calcium hypochlorite added in 20 g increments over 1 hour. The solution is decanted to provide a 4.7 percent hypochlorous acid (HOCl) solution in MEK.

Into a flask is placed 152.6 g of the A1 solution. The solution pH is 7.14. The solution is cooled to 1 to 2° C. and 133.3 g of the HOCl solution is added over a period of about 1 hour while the temperature is maintained below 3° C. (using an ice bath). The solution is stirred at this temperature for 2 hours, after at which the ice is allowed to melt, and the solution is stirred overnight. The next morning, the HOCl concentration is about 0.7 percent. Three grams sodium bisulfite is added to destroy the residual HOCl. The resulting solution is placed into a separatory funnel, the lower aqueous layer collected and sparged overnight with nitrogen to remove MEK. The product (resin A2) is 25.71 percent solids.

To 30 g of resin A2 is added enough water to make a 22 percent solids solution. The sufficient 5M NaOH is added dropwise at 25°-30° C. to raise the pH to 7.44. Viscosity is monitored and, after 68 minutes, the viscosity is 110 cP. Sufficient concentration HCl (hydrochloric acid) is added to lower the pH to 4.05, and 5.07 grams of water is added. The final wet strength resin (Comparative) is 20.15 percent solids and had a Gardner color of 14-15 as measured by a Gardner 212 Color Comparator.

Chloride analysis is performed on a Dionex Ion Chromatograph with a conductivity detector. An AS4A separation column with companion guard column is used. The standard anion eluent is 0.0075M NaHCO$_3$ and 0.025M Na$_2$CO$_3$.

For a standard, a known 2 percent chloride ion solution is diluted by 10,000 and the chloride ion concentration is determined using the above Dionex. The concentration is 1.999 ppm ± 0.004. A sample of A1 is diluted by 10,000 and the chloride ion concentration determined to be 1.477 ppm ± 0.004. Thus, the actual concentration without dilution is 14,770 ppm.

A chloride ion analysis of the polymer solution from the reaction with allyl chloride would give the maximum percentage of allyl functionally which could have added to the polymer, because the reaction of allyl chloride with a DETA/adipic acid polyamide releases one mole of chloride ion for every mole of allyl chloride which reacts with the polymer.

The maximum chloride ion concentration, if all the allyl chloride reacted, would be 24,510 ppm. Therefore:

14,770 ppm / 24510 ppm = 60.26 percent

Thus, a maximum—not allowing for the sources of chloride ion—of 60 percent of the amine nitrogens in the polyamide reacted to form an unsaturated functional group.

This compares to Example 2 which as determined by $^{13}$C and H NMR is over 97 mole percent alkylated on amine nitrogen. Also, addition of 50 mole percent excess allyl chloride for in the process of this example fails to raise the percentage of amine nitrogens reacted (alkylated) above 62 percent as determined by NMR.

EXAMPLE 16

PREPARATION OF A WET STRENGTH RESIN BY ALKYLATING A POLYAMIDE AT HIGH pH

Into a flask is placed 125 g of polyamide formed by the process of Comparative Example Y (51.2 percent solids), 285 g of water, and 21.4 g of allyl chloride. Solution pH is adjusted to 11.3 with 50 percent aqueous NaOH, and the solution is heated to 45° C. pH is maintained around 11.0 with 50 percent aqueous NaOH during the reaction for 1.5 hours at 45° C. Then 5 g of allyl chloride is added. After another 2.5 hours under those conditions, 5 g of allyl chloride is added. Then the reaction mixture is heated at 45° C. for an additional 7 hours. The reaction is cooled to 25° C. and unreacted allyl chloride removed.

Analysis of the degree of substitution by Proton ("H) NMR shows about 75 percent substitution of unsaturated alkyl groups on amine nitrogens. An additional 21.4 g of allyl chloride is added and the solution heated at 45° C. (maintaining pH around 11) for 30 hours. The solutions is cooled, and unreacted allyl chloride is removed by placing the reaction mixture in a vacuum at 25° C. The final product is pale, light yellow.

A proton spectrum of this product indicates that essentially 100 percent substitution has occurred, as evidenced by disappearance of a peak at 2.99 ppm from TMS which peak is indicative of hydrogen on carbon atoms adjacent to unsubstituted nitrogen.

This example shows that a high degree of substitution of unsaturated alkylating agent can be achieved on a polyamide by alkylating at a high pH.

Paper samples are formed and their wet and dry strengths measured after a room temperature cure of 4 days by the procedure of Example 2 with the results in Table 13:

| Resin Tested | Dry Strength (psig)** | Dry Strength (Kg/m²) | Wet Strength (psig) | Wet Strength (Kg/m²) |
|---|---|---|---|---|
| Control* (no additive) | 60.7 | 42,690 | 1.1 | 774 |
| Example 16 | 60.5 | 42,550 | 9.4 | 6611 |
| Example 15 | 62 | 43,600 | 19.7 | 13855 |
| Commercial Resin (Reference X)* | 62 | 43,600 | 4.9 | 3446 |

*Not an example of the invention.
**Maximum instrument reading is 62.

Differences in wet and dry strengths between resins of Examples 15 and 16 are believed to be attributable to such factors as residual reactants (allyl chloride) and by-products (e.g. allyl alcohol) in the resin of Example 16. The resin in Example 15, however, contains no residual reactants, particularly no chlorine-containing reactants (monomers).

What is claimed is:

1. A process of preparing a polyaminopolymer which contains functionality comprising the steps of (a) contacting a polyfunctional amine with an ethylenically unsaturated alkylating agent under reaction conditions to form an amine/ethylenically unsaturated alkylating agent adduct; (b) contacting the adduct with a polyfunctional compound under reaction conditions to form a polyaminopolymer (c) contacting the polyaminopolymer with a halogen, hypohalous acid or precursor thereof under reaction conditions to form a polyaminopolymer having halohydrin or dihalo functionality; and crosslinking the polyaminopolymer by either or both: (h), after step (b) and before step (c), contacting the polyaminopolymer with a crosslinking agent therefor having at least two functional groups reactive with amine groups under reaction conditions to form a crosslinked polyaminopolymer; or (d), after step (c) raising the pH of the polyaminopolymer having halohyrin or vicinal dihalo functionality sufficiently to cause an increase in molecular weight.

2. The process of claim 1 wherein the polyaminopolymer is soluble in water.

3. The process of claim 2 wherein step (b) additionally comprises contacting the adduct and polyfunctional compound with a saturated polyamine.

4. The process of claim 3 wherein the mole ratio of adduct to saturated polyamine is from about 100:0 to about 70:30.

5. The process of claim 4 wherein in step (a) the mole ratio of polyfunctional amine to alkylating agent is from about 10:1 to about 1:10.

6. The process of claim 2 wherein the alkylating agent is an organic chloride.

7. The process of claim 5 wherein the alkylating agent is allyl chloride, allyl bromide, allyl iodide, 1-chloro-3-butene, 2-chloro-3-butene, 1-chloro-4-pentene, 2-chloro-4-pentene, 3-chloro-4-pentene, 1-chloro-2-butene, 1-chloro-2-pentene, 1-chloro-3-pentene, 3,3-dichloropropene, 3,3,3-trichloropropene, 1,3-dichloropropene, 1,2,3-trichloropropene or 1,1,3-trichloropropene.

8. The process of claim 2 wherein the polyfunctional amine is an alkanolamine, polyethylene polyamine, polypropylene polyamine, polybutylene polyamine, or hexamethylenediamine.

9. The process of claim 8 wherein the polyfunctional amine is diethylenetriamine, bis-2-hydroxyethyl ethylenediamine, triethylenetetraamine, tetraethylenepentamine, pentaethylenehexamine, hexaethyleneheptamine, aminoethylpiperazine, hydroxyethylpiperazine, aminoethylethanolamine, bis(3-aminopropyl)ethylenediamine, bis(3-aminoethyl)-1,3-diaminopropane, n,n-dimethyldiethylenetriamine, tris(2-aminoethyl)amine, polyethyleneimine, branched, a cyclic isomer or congener, of said amines or a polyethylene polyamine having an average molecular wight of from about 200 to about 500.

10. The process of claim 9 wherein the polyfunctional amine is diethylenetriamine and the alkylating agent is allyl chloride.

11. The process of claim 2 wherein the polyfunctional amine has more than one amine group, independently selected form primary of secondary amine groups, or amine groups which differ in their $pK_b$'s by at least about 2 units, and at least one amine group is blocked under reaction conditions to form a selective reaction product of the ethylenically unsaturated alkylating agent and an amine group.

12. The process of claim 11 wherein the pH is adjusted to from about 4 to about 9 such that the ethylenically unsaturated alkylating agent reacts selectively agent and an amine group.

13. The process of claim 11 wherein the preselected amine group is a secondary amine group.

14. The process of claim 2 wherein in step (b) the mole ratio of adduct to polyfunctional compound is from about 0.6 to about 1.4.

15. The process of claim 14 wherein in step (b) the polyfunctional compound has at least 2 reactive groups which are independently carboxylic acid, carboxylic ester, acyl halide, a, β-ethylenically unsaturated acid, or a,β-ethylenically unsaturated ester groups.

16. The process of claim 15 wherein the polyfunctional compound is diglycolic acid or a saturated aliphatic dicarboxylic acid having from about 3 to about 8 carbon atoms.

17. The process of claim 15 wherein the polyfunctional compound is adipic acid, succinic acid, oxalic acid, glutaric acid, pimelic acid, suberic acid, azelaic acid, sebacic acid.

18. The process of claim 2 wherein in step (c) the equivalents of halogen, hypohalous acid or precursor thereof is from about 90 to about 110 percent of the equivalents of polyaminopolymer.

19. The process of claim 17 wherein step (c) comprises contacting the polyaminopolymer with a halogen, hypohalous acid or precursor thereof at a pH of less than about 3 under reaction conditions to form a polyaminopolymer having halohydrin or dihalo functionality.

20. The process of claim 2 wherein in step (d) the pH is raised to from about 5 to about 8.

21. The process of claim 2 comprising an additional step (e) between steps (b) and (c) of lowering the pH of the solution of polyaminopolymer having halohydrin or dihalo functionality to a pH of from about 1 to about 3.

22. The process of claim 21 wherein step (e) comprises adding an acid selected from the group consisting of hydrochloric, nitric, sulfuric, formic and perchloric.

23. The process of claim 22 wherein the acid is hydrochloric.

24. The process of claim 2 comprising an additional step (f) after step (b) of reacting the polyaminopolymer with an alkylating agent under reaction conditions to form quaternary amine groups.

25. The process of claim 24 wherein the alkylating agent is methyl iodide, dimethyl carbonate, trimethyloxonium tetrafluoroborate, triethyloxonium tetrafluoroborate, methyltosylate, ethyl tosylate, dimethyl sulfate, diethyl sulfate, ethyl iodide, methyl bromide, ethyl bromide or a mixture thereof.

26. The process of claim 2 comprising an additional step (g) after step (b) of reacting the polyaminopolymer with a compound having a quaternary amine group and a group reactive with the polyaminopolymer under reaction conditions to introduce quaternary amine groups onto the polyaminopolymer.

27. The process of claim 26 wherein the compound is glycidyltrimethylammonium chloride, (2-bromoethyl)-trimethylammonium chloride or bromide, (2-chloroethyl)trimethylammonium chloride.

28. The process of claim 1 wherein after step (a) the amine/unsaturated alkylating agent adduct is purified to remove unreacted alkylating agent.

29. The process of claim 1 wherein in step (h) the crosslinking agent is an alkyl compound having from 2 to about 6 carbon atoms and at least 2 halogen atoms selected from bromine or chlorine or mixtures thereof.

30. The process of claim 29 wherein the crosslinking agent is selected from 1,2-dichloroethane, succinyl chloride, malonyl chloride, 1,3-dichloropropane or 1,3-dibromopropane, 1,3-dibromopropane; 1,2-dibromoethane, succinyl bromide, malonyl bromide, or mixtures thereof.

31. The process of claim 29 wherein the crosslinking agent is contacted in an amount sufficient to produce from about 3 to about 18 percent crosslinking based on secondary amine groups in the polymer.

32. The process of claim 2 additionally comprising a step (j) drying the resulting polyaminopolymer to less than about 20 percent by weight water.

33. The process of claim 32 wherein step (j) comprises heating the polyaminopolymer to about 10 percent by weight water.

34. The process of claim 32 additionally comprising a step (k) dissolving the polyaminopolymer in water.

35. A water soluble polyaminopolymer prepared by a process comprising the steps of (a) contacting a polyfunctional amine with an ethylenically unsaturated alkylating agent under reaction conditions to form an amine/ethylenically unsaturated alkylating agent adduct; (b) contacting the adduct with a polyfunctional compound under reaction conditions to form a polyaminopolymer; (c) contacting the polyaminopolymer with a halogen, hypohalous acid or precursor thereof under reaction conditions to form a polyaminopolymer having halohydrin or dihalo functionality; and crosslinking the polyaminopolymer by either or both of: (h) after step (b) and before step (c), contacting the polyaminopolymer with a crosslinking agent therefor having at least two functional groups reactive with amine groups therefor having at least two functional groups reactive with amine (d), after step (c), raising the pH of the polyaminopolymer having halohydrin or vicinal dihalo functionality sufficiently to cause an increase in molecular weight.

36. The polyaminopolymer of claim 35 wherein the adduct prepared in step (a) is purified before step (b).

37. The polyaminopolymer of claim 36 wherein, in step (b), contacting of the adduct and polyfunctional compound is additionally with a saturated polyamine.

38. The polyaminopolymer of claim 35 wherein the alkylating agent is allyl chloride, allyl bromide, allyl iodide, 1-chloro-3-butene, 2-chloro-3-butene, 1-chloro-4-pentene, 2-chloro-4-pentene, 3-chloro-4-pentene, 1-chloro-2-butene, 1-chloro-2-pentene, 1-chloro-3-pentene, 3,3-dichloropropene, 3,3,3-trichloropropene, 1,3-dichloropropene, 1,2,3-tirchloropropene or 1,1,3-trichloropropene and the polyfunctional amine is diethylenetriamine, bis-2-hydroxyethyl ethylenediamine, triethylenetetraamine, tetraethylenepentamine, pentaethylenehexamine, hexaethyleneheptamine, aminoethylpiperazine, hydroxyethylpiperazine, aminoethylethanolamine, bis(3-aminopropyl)ethylenediamine, bis(3-aminoethyl)-1,3-diaminopropane, n,n-dimethyldiethylenetriamine, tris-(2-aminoethyl)amine, polyethyleneimine, a branched or cyclic isomer or congener of said amines, or a polyethylene polyamine having an average molecular weight of from about 200 to about 500.

39. The polyaminopolmyer of claim 35 wherein the polyaminopolymer is contacted with hypochlorus acid, and in step (c) contacting is at a pH of less than about 3.

40. The polyaminopolymer of claim 39 wherein step (b) additionally comprises contacting the adduct and polyfunctional compound with a saturated polyamine.

41. The polyaminopolymer of claim 40 wherein the mole ratio of adduct to saturated polyamine is from about 100:0 to about 70:30.

42. The polyaminopolymer of claim 35 wherein the polyfunctional amine has more than one amine group, selected from primary and secondary amine groups and amine groups which differ in their $pK_b$'s by at least about 2 units, and at least one amine group is blocked under reaction conditions to form a selective reaction product of the ethylenically unsaturated alkylating agent a preselected amine group.

43. The polyaminopolymer of claim 35 prepared by a process additionally comprising a step (f) after step (b) of reacting the polyaminopolymer with an alkylating agent under reaction conditions to form quaternary amine groups.

44. The polyaminopolymer of claim 43 wherein the alkylating agent is methyl iodide, dimethyl carbonate, trimethyloxonium tetrafluoroborate, triethyloxonium tetrafluoroborate, methyltosylate, ethyl tosylate, diethyl sulfate, dimethyl sulfate, ethyl iodide, methyl bromide, ethyl bromide or mixtures thereof.

45. The polyaminopolymer of claim 35 prepared by a process comprising an additional step (g) after step (b) of reacting the polyaminopolymer with a compound having a quaternary amine group and a group reactive with the polyaminopolymer under reaction conditions to introduce quaternary amine groups onto the polyaminopolymer.

46. The polyaminopolymer of claim 45 wherein the compound is glycidyltrimethylammonium chloride, (2-bromoethyl)trimethylammonium chloride or bromide, (2-chloroethyl)trimethylammonium chloride.

47. The polyaminopolymer of claim 35 prepared by a process additionally comprising a step (j) drying the resulting polyaminopolymer to less than about 20 percent by weight water.

48. The polyaminopolymer of claim 47 prepared by a process additionally comprising a step (k) dissolving the polyaminopolymer in water.

* * * * *

UNITED STATES PATENT AND TRADEMARK OFFICE
CERTIFICATE OF CORRECTION

PATENT NO. : 5,278,255

DATED : January 11, 1994

INVENTOR(S) : Otha G. Weaver, Jr. et al

Page 1 of 2

It is certified that error appears in the above-indentified patent and that said Letters Patent is hereby corrected as shown below:

On the title page: Item [54] and Column 1, line 3, in the title "UNSATURATED POLYAMINOPOLYMER, DERIVATIVES THEREOF AND PROCESSES FOR MAKING" should read --UNSATURATED POLYAMINOPOLYMERS, DERIVATIVES THEREOF AND PROCESSES FOR MAKING--.

In claim 1, column 39, line 34, "both:" should read --both of:--.

In claim 11, column 40, line 16, "form" should read --from-- and "of" should read --or--.

In claim 12, column 40, line 26, delete "agent and an amine" and insert --with a preselected amino--.

In claim 35, column 41, lines 61-62, delete "therefor having at least two functional groups reactive with amine" and insert --under reaction conditions to form a crosslinked polyaminopolymer; or--.

UNITED STATES PATENT AND TRADEMARK OFFICE
CERTIFICATE OF CORRECTION

PATENT NO. : 5,278,255
DATED : January 11, 1994
INVENTOR(S) : Otha G. Weaver, Jr. et al.

It is certified that error appears in the above-indentified patent and that said Letters Patent is hereby corrected as shown below:

In claim 38, column 42, line 10, "1,2,3-tirchloropropene" should read -- 1,2,3-trichloropropene--.

In claim 39, column 42, line 22, "polyaminopolmyer" should read -- polyaminopolymer--.

Signed and Sealed this

Fourth Day of April, 1995

Attest:

BRUCE LEHMAN

*Attesting Officer*      *Commissioner of Patents and Trademarks*